United States Patent
Wang et al.

(10) Patent No.: US 12,380,214 B2
(45) Date of Patent: Aug. 5, 2025

(54) SYSTEM AND METHOD OF DETECTING TAMPERING OF AN INFORMATION HANDLING SYSTEM

(71) Applicant: Dell Products L.P., Round Rock, TX (US)

(72) Inventors: Isaac Qin Wang, Austin, TX (US); Adolfo Sandor Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 18/178,860

(22) Filed: Mar. 6, 2023

(65) Prior Publication Data

US 2024/0303342 A1     Sep. 12, 2024

(51) Int. Cl.
*G06F 21/57*    (2013.01)
*G06F 21/71*    (2013.01)

(52) U.S. Cl.
CPC ............ *G06F 21/575* (2013.01); *G06F 21/71* (2013.01); *G06F 2221/034* (2013.01)

(58) Field of Classification Search
CPC ... G06F 21/575; G06F 21/71; G06F 2221/034
See application file for complete search history.

(56) References Cited

U.S. PATENT DOCUMENTS

| | | | |
|---|---|---|---|
| 2,663,806 A | 12/1953 | Darlington | |
| 5,692,219 A * | 11/1997 | Chan | G06F 13/4063 710/36 |
| 11,003,780 B2 * | 5/2021 | Liu | G06F 8/654 |
| 11,487,872 B2 * | 11/2022 | McDonough | G06F 21/75 |

(Continued)

FOREIGN PATENT DOCUMENTS

| | | | | |
|---|---|---|---|---|
| CN | 101126995 A | * | 2/2008 | ......... G06F 11/0745 |
| CN | 104182290 A | * | 12/2014 | |

(Continued)

OTHER PUBLICATIONS

Brown, Len. "ACPI in Linux." Linux Symposium. vol. 51., p. 20, 2005.

(Continued)

*Primary Examiner* — Sher A Khan
(74) *Attorney, Agent, or Firm* — McDermott Will & Emery LLP

(57) ABSTRACT

In one or more embodiments, one or more systems, one or more methods, and/or one or more processes may: provide a first chip select signal to a chip of an information handling system (IHS), which stores at least a portion of IHS firmware, while at least one processor of the IHS is executing processor instructions; determine that a second chip select signal is provided to the chip; provide, to an embedded controller of the IHS, a signal that indicates that the second chip select signal has been provided to the chip; receive a signal to boot the IHS; determine if the embedded controller has received the signal that indicates that the second chip select signal has been provided to the chip; if so, prevent the IHS from booting; and if not, permit the IHS to boot utilizing the at least the portion of the IHS firmware stored by the chip.

18 Claims, 14 Drawing Sheets

(56) References Cited

U.S. PATENT DOCUMENTS

| | | | | |
|---|---|---|---|---|
| 2014/0164725 | A1* | 6/2014 | Jang | G06F 21/575 |
| | | | | 710/316 |
| 2019/0236281 | A1* | 8/2019 | Hershman | G06F 21/85 |
| 2019/0243660 | A1* | 8/2019 | Joshi | G06F 9/52 |
| 2019/0354377 | A1* | 11/2019 | Tan | G06F 3/0238 |
| 2020/0184076 | A1* | 6/2020 | McDonough | G06F 21/575 |
| 2020/0193029 | A1* | 6/2020 | Liu | H04L 9/3234 |

FOREIGN PATENT DOCUMENTS

| | | | | |
|---|---|---|---|---|
| CN | 109325352 | A * | 2/2019 | |
| EP | 3432152 | A1 * | 1/2019 | G06F 15/163 |

OTHER PUBLICATIONS

Advanced Configuration and Power Interface (ACPI) Specification, Release 6.5, UEFI Forum, Inc. (Aug. 29, 2022).
Gough, Corey, Ian Steiner, and Winston Saunders. Energy Efficient Servers: Blueprints for Data Center Optimization. Springer Nature, Apr. 7, 2015; pp. 93-151.
Pavlic, Theodore. Lab 7: Output Filtering and Project Integration. ECE 327: Electronic Devices and Circuits Laboratory I, 2009, 26 p.

* cited by examiner

| | Condition | Input 440 (ALWON) | Coupling 415 (ALWON_N) | Input 441 (FN_SELECT) | Input 418 (SPI_CS0 or SPI_CS1) | EC Reset 458 | Read/Write Chip Access |
|---|---|---|---|---|---|---|---|
| 482A | G3 Power State (DC Mode): An attacker utilizes an electrical connector 310 to access a chip 314 | 0 | 1 | DC | 0 | 0 | Attacker cannot access chip 314 |
| 482B | G3 Power State (Sharing Mode): EC 130 accesses a chip 314 | 1 | 0 | 1 | Alternating (between 0 and 1) | 1 | EC can access chip 314 |
| 482C | S5 Power State: An attacker utilizes an electrical connector to access a chip 314 | 1 | 0 | 1 | 1 | 1 | Attacker cannot access chip 314 |
| 482D | S5 Power State: User utilizes a test fixture | 1 | 0 | 0 | 1 | 0 | Test fixture can access chip 314 |
| 482E | S0 Power State: PCH 132 accesses a chip 314 | 0 | 0 | 1 | Alternating (between 0 and 1) | 0 | PCH 132 can access chip 314 |
| 482F | Unauthorized access utilizing an electrical connector to access a chip 314 | 1 | 0 | 0 | 0 | 0 | Unauthorized access to chip 314 is denied |

FIG. 4F

SYSTEM AND METHOD OF DETECTING TAMPERING OF AN INFORMATION HANDLING SYSTEM

BACKGROUND

Field of the Disclosure

This disclosure relates generally to information handling systems and more particularly to detecting tampering of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may provide a first chip select signal to a chip of an information handling system, which stores at least a portion of information handling system firmware, while at least one processor of the information handling system is executing processor instructions; may determine that a second chip select signal is provided to the chip; may provide, to an embedded controller of the information handling system, a signal that indicates that the second chip select signal has been provided to the chip; may receive the signal that indicates that the second chip select signal has been provided to the chip; may receive a signal to boot the information handling system; may determine if the embedded controller has received the signal that indicates that the second chip select signal has been provided to the chip; if the embedded controller has received the signal that indicates that the second chip select signal has been provided to the chip, may prevent the information handling system from booting; and if the embedded controller has not received the signal that indicates that the second chip select signal has been provided to the chip, may permit the information handling system to boot utilizing the at least the portion of the information handling system firmware stored by the chip.

In one or more embodiments, the chip may include a serial peripheral interface (SPI) that is configured to communicate data with a SPI bus or a SPI controller of the information handling system. For example, the chip may receive the first chip select signal in accordance with a SPI specification. In one or more embodiments, the circuit may include an exclusive-OR (XOR) circuit that is configured to determine that the second chip select signal is provided to the chip. In one example, the XOR circuit may include a metal oxide semiconductor field effect transistor (MOSFET). For instance, an input to the XOR circuit, which receives the first chip select signal, may be coupled to a gate of the MOSFET. In another example, the XOR circuit may include a bipolar junction transistor (BJT). In one instance, an input, which receives the first chip select signal, to the XOR circuit may be coupled to a base of the BJT. In another instance, the BJT may be a Darlington transistor that includes multiple bipolar junction transistors (BJTs). As an example, the input to the XOR circuit may be coupled to a base of a first BJT of the Darlington transistor. For instance, the input to the XOR circuit may be coupled to a base of a first BJT of the multiple BJTs of the Darlington transistor.

In one or more embodiments, the information handling system firmware may be compliant with at least a portion of a Unified Extensible Firmware Interface (UEFI) and may be compliant with at least a portion of an Advanced Configuration and Power Interface (ACPI). In one or more embodiments, the circuit and the chip may be mounted to a printed circuit board of the information handling system. In one or more embodiments, receiving the signal to boot the information handling system may include the embedded controller receiving the signal to boot the information handling system. In one or more embodiments, the embedded controller may be configured to store information associated with the signal that indicates that the second chip select signal has been provided to the chip. For example, to determine if the embedded controller has received the signal that indicates that the second chip select signal has been provided to the chip, the embedded controller may retrieve the information associated with the signal that indicates that the second chip select signal has been provided to the chip and may determine if the embedded controller has received the signal that indicates that the second chip select signal has been provided to the chip based at least on the information associated with the signal that indicates that the second chip select signal has been provided to the chip.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 4F illustrates an example of a table of information handling system states and possible associated attack scenarios, according to one or more embodiments.

DETAILED DESCRIPTION

Figure 1A:
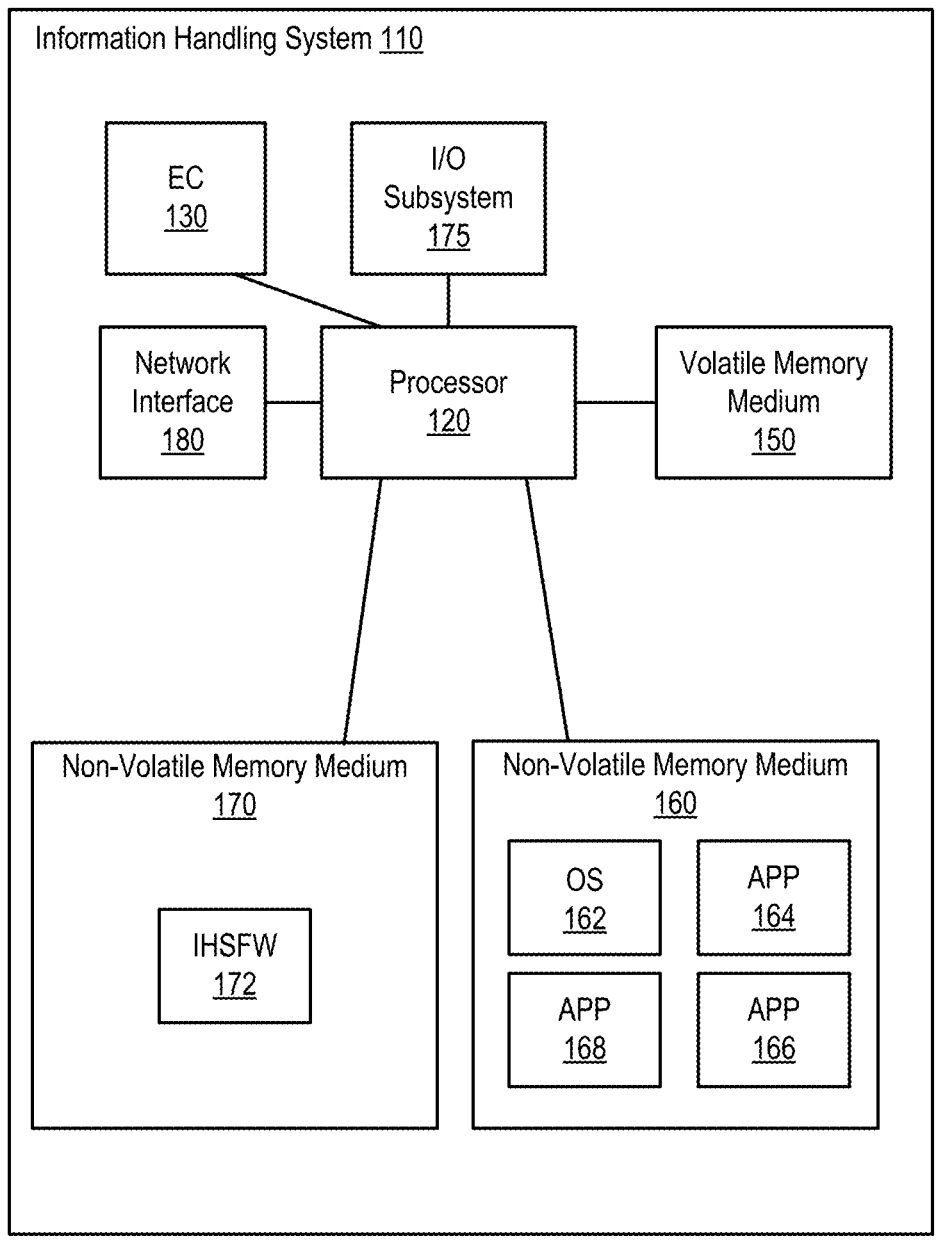
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include one or more security features. For example, a security feature may protect against a physical presence attack on a chip of the information handling system. For instance, the chip may store information handling system firmware. As an example, if the information handling system firmware becomes compromised, the information handling system and/or any data stored by the information handling system may become compromised.

In one or more embodiments, the information handling system firmware may be associated with a digital signature, which may be utilized to authenticate the information handling system firmware; however, the digital signature may be overwritten and may be utilized to authenticate compromised information handling system firmware. For example, if physical access is available to a chip that stores at least a portion of information handling system firmware and/or a digital signature of the at least the portion of the information handling system firmware, the at least the portion of the information handling system firmware and/or the digital signature of the at least the portion of the information handling system firmware may be compromised. For instance, a programmer device may be communicatively coupled to the chip and may be utilized to reprogram the chip. As an example, the programmer device may be communicatively coupled to the chip via a programmer clip. For instance, the programmer device and the programmer clip may be utilized to reprogram the chip without a need to de-solder the chip.

In one or more embodiments, an information handling system may be left unattended for a period of time, which may pose a risk for a physical attack. For example, data stored via the information handling system may be moved, duplicated, overwritten, modified, and/or deleted. In one or more embodiments, one or more security features of the information handling system may prevent and/or mitigate a physical attack. For example, one or more systems, one or more methods, and/or one or more processes may detect such physical presence tampering events.

In one or more embodiments, a chip (e.g., a microchip) may include an integrated circuit (IC). For example, an IC may include multiple electronic circuits on a small, flat piece of semiconductor material. In one instance, the semiconductor material may be or may include silicon. In another instance, the semiconductor material may be or may include germanium. In one or more embodiments, a large number of transistors, diodes, resistors, and/or capacitors may be integrated into a chip. For example, circuits of a chip may be orders of magnitude smaller, faster, and/or less expensive than those circuits that are constructed of discrete electronic components. In one instance, digital chips or digital integrated circuits (ICs) may include millions or billions of logic gates, flip-flops, multiplexers, and other circuits in a few square millimeters. In another instance, mass production capability, reliability, and building-block approaches associated with chips may have ensured rapid adoption of standardized chips in place of designs that use discrete transistors, diodes, resistors, and/or capacitors. In one or more embodiments, a chip may include a housing. For example, the housing may house an IC of the chip. In one instance, the housing may include a ceramic. In another instance, the housing may include a polymer. As an example, the polymer may be or may include a plastic.

In one or more embodiments, an information handling system may include multiple chips. For example, the information handling system may include one or more printed circuit boards (PCBs). For instance, a printed circuit board (PCB) of the one or more PCBs may include or may be a motherboard, to which the multiple chips may be coupled. As an example, at least a portion of the multiple chips may be soldered to the motherboard. In one or more embodiments, a data storage device may include one or more chips. In one example, a data storage device may be or may include a volatile memory medium. In another example, a data storage device may be or may include a non-volatile memory medium.

In one or more embodiments, an information handling system may store data and/or processor instructions via a data storage device. For example, a processor of the information handling system may store data and/or processor instructions via a data storage device. In one or more embodiments, data and/or processor instructions may be stored via a data storage device by a chip programming device or an IC programming device. For example, during production of an information handling system, an information handling system manufacturer may utilize a chip programming device or an IC programming device to store information handling system firmware on a data storage device. For instance, the information handling system may utilize the information handling system firmware (e.g., data and/or processor instructions) to boot the information handling system to an operating system.

In one or more embodiments, an information handling system may be compromised. In one example, the information handling system may be compromised via a computer virus. For instance, the computer virus may be included in downloaded software, an email attachment, etc. In another example, the information handling system may be compromised via a chip programming device or an IC programming device. For instance, a person may utilize a chip programming device or an IC programming device to install nefarious data and/or nefarious processor executable instructions on a data storage device of the information handling system, which may compromise the information handling system. As an example, a processor of the information handling system may execute the nefarious processor executable instructions, which may compromise security of the information handling system. As another example, a processor of the information handling system may utilize the nefarious data, which may compromise security of the information handling system.

In one or more embodiments, an information handling system may support multiple power states. For example, the multiple power states may be associated with power states defined in an Advanced Configuration and Power Interface (ACPI) specification. In one or more embodiments, the information handling system may support variations of the power states defined in the ACPI specification. For example, the variations of the power states defined in the ACPI specification may include one or more of hybrid sleep state and a fast startup state, among others. In one or more embodiments, power states of an information handling system may include S0, S0 low-power idle (known as "modern standby"), S1, S2, S3, S4, S5, and G3, among others.

In one example, when the information handling system is in the power state S0, the information handling system may be fully usable, and hardware components of the information handling system that are not in use may save power by entering a low power state. For instance, when the information handling system is in the power state S0, a processor of the information handling system may be executing processor instructions. In a second example, when the information handling system is in the power state S0 low-power idle, the information handling system may be able to quickly switch from a low-power state to high-power state in response to a hardware event and/or a network event. In one or more instance, an information handling system that supports modern standby may not utilize one or more of power states S1, S2, and S3.

In a third example, when the information handling system is in one of the power states S1, S2, or S3, a first amount of power consumed in power states S1, S2, or S3 may be less than a second amount of power consumed in power state S0 and may be more than a third amount of power consumed in power state S4. In one instance, power state S3 may consume less power than power state S2. In another instance, power state S4 may consume less power than power state S3. In one case, an information handling system that supports a power state of power states S1, S2, or S3 may only support one of power states S1, S2, or S3, according to one or more embodiments. In power states S1, S2, and S3, volatile memory may be kept refreshed to maintain one or more information handling system states. One or more components may remain powered so the information handling system can wake from input from one or more of a keyboard, a pointing device (e.g., a touchpad, a mouse, a trackball, etc.), a network, and a universal serial bus (USB) device, among others.

In a fourth example, the information handling system may utilize a hybrid sleep power state, which may utilize a hibernation file with one or more of power states S1, S2, and S3. For instance, the hibernation file may store an information handling system state, within a nonvolatile memory medium, in case the information handling system loses power while in the hybrid sleep power state. In a fifth example, when the information handling system is in power state S4, power consumption of the information handling system may be reduced to a lowest level, but one or more components of the information handling system may remain powered so the information handling system can wake from input from one or more of a keyboard, a pointing device (e.g., a touchpad, a mouse, a trackball, etc.), a network, and a USB device, among others. In one instance, in power state S4, the information handling system may appear to be "off" to a person. In another instance, a working context of the information handling system may be restored if the working context was stored via a nonvolatile memory medium.

In a sixth example, when the information handling system is in power state S5, the information handling system may be fully shut down and may undergo a boot cycle to be restored to functionality. For instance, the information handling system may appear to be "off" to a person. In another example, when the information handling system is in power state G3, the information handling system may be completely off and may consume no power. For instance, the information handling system may return to a working state after booting up the information handling system. In one or more embodiments, when the information handling system is in power state G3, the information handling system may be completely off and only a few components of the information handling system may consume fractions of a Watt of electrical power.

In one or more embodiments, when an information handling system is in the modern standby power state (e.g., S0 low-power idle mode power state), the information handling system may remain partially running. For example, the information handling system may stay up-to-date if a suitable network is available and/or may wake when an action is required (e.g., maintenance of an operating system, maintenance of information handling system firmware, etc.). In one instance, the information handling system may wake from the modern standby power state faster than from one or more of power states S1, S2, and S3, among others. In another instance, the information handling system may wake from the modern standby power state faster than from one or more of power states S4, S5, and G3, among others. In one or more embodiments, the modern standby power state may enable an instant on and/or an instant off user experience. For example, the modern standby power state may permit the information handling system to remain connected to a network while in a low power state. For instance, when the information handling system is in the modern standby power state, the information handling system may appear to be "off" to a person.

In one or more embodiments, when an information handling system is in the G3 power state, a circuit of the information handling system may detect when an access request originates from an authorized component (e.g., an embedded controller, information handling system firmware, an INTEL® management engine (ME), etc.) of the information handling system. In one example, if an access request originates from an authorized component of the information handling system, access to a chip of the information handling system may not be blocked. For instance, if an access request originates from an authorized component of the information handling system, access to a chip of the information handling system may permit. In another example, if an access request does not originate from an authorized component of the information handling system, access to a chip of the information handling system may be blocked. For instance, if an access request does not originate from an authorized component of the information handling system, access to a chip of the information handling system may not be permitted.

In one or more embodiments, a circuit of the information handling system may determine if an access request originates from an authorized component of the information handling system. For example, the circuit of the information handling system may determine if an external programmer device is attempting to access one or more portions of the information handling system. For instance, the one or more portions of the information handling system may include one or more circuits and/or one or more chips of the information handling system, among others. As an example, the one or more chips may include non-volatile storage that stores data and/or information handling system firmware of the information handling system.

In one or more embodiments, the circuit of the information handling system, which may determine if an external programmer device is attempting to access one or more portions of the information handling system, may provide one or more signals to an embedded controller of the information handling system. For example, the circuit may provide the one or more signals to a general purpose input/output (GPIO) pin of the embedded controller.

In one or more embodiments, the embedded controller may log an event associated with an unauthorized attempt to access one or more portions of the information handling system. For example, the log of the event associated with the unauthorized attempt to access one or more portions of the information handling system may be utilized to warn a person (e.g., a user, an administrator, etc.) about the unauthorized attempt to access one or more portions of the information handling system. For instance, the person may be warned about the unauthorized attempt to access one or more portions of the information handling system via a power on self test (POST) of the information handling system. As an example, the person may be warned about the unauthorized attempt to access one or more portions of the information handling system until the log of the unauthorized attempt to access one or more portions of the information handling system is cleared. As an example, the log of the unauthorized attempt to access one or more portions of the information handling system may be cleared by an account associated with one or more administrator privileges.

In one or more embodiments, the log of the unauthorized attempt to access one or more portions of the information handling system may be provided or may be made available to a manageability stack such that an administrator may track and/or may catch such occurrences of unauthorized attempts to access one or more portions of the information handling system. In one or more embodiments, the circuit may not provide a signal to the embedded controller, which may indicate that no unauthorized attempt to access one or more portions of the information handling system has occurred. For example, if the circuit does not provide a signal to the embedded controller, which may indicate that no unauthorized attempt to access one or more portions of the information handling system has occurred, no event associated with an unauthorized attempt to access one or more portions of the information handling system may be logged.

In one or more embodiments, the circuit may include one or more discrete components. For example, the one or more discrete components may be mounted to a side of a motherboard of the information handling system that may be difficult to access. For instance, the one or more discrete components may be mounted to an inaccessible portion of the motherboard of the information handling system.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (EC) 130, a volatile memory medium 150, non-volatile memory media 160 and 170, an I/O subsystem 175, and a network interface 180. As illustrated, EC 130, volatile memory medium 150, non-volatile memory media 160 and 170, I/O subsystem 175, and network interface 180 may be communicatively coupled to processor 120.

In one or more embodiments, one or more of EC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of EC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of EC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. In one or more embodiments, IHSFW 172 may include data. For example, IHSFW 172 may include configuration data.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated in FIG. 1A). In one or more embodiments, IHS 110 may include a battery. For example, the battery may provide electrical power to one or more portions of IHS 110. In one or more embodiments, IHS 110 may be a portable information handling system. For example, IHS 110 may be a laptop computer system, a mobile device, a tablet computing device, a PDA, an electronic music player, an electronic camera, or an electronic video player, among others. For instance, the battery of IHS 110 may provide power to IHS 110 when IHS 110 is not receiving or cannot receive power from an external electrical power source (e.g., an electrical socket, an electrical wall socket, etc.).

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a REDFISH® standard. In one instance, one or more portions of the remote access controller may be compliant with one or more portions of a REDFISH® standard. In another instance, one or more portions of the remote access controller may implement one or more portions of a REDFISH® standard. A REDFISH® specification and other REDFISH® documentation can be obtained from DMTF (formerly known as the Distributed Management Task Force). In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
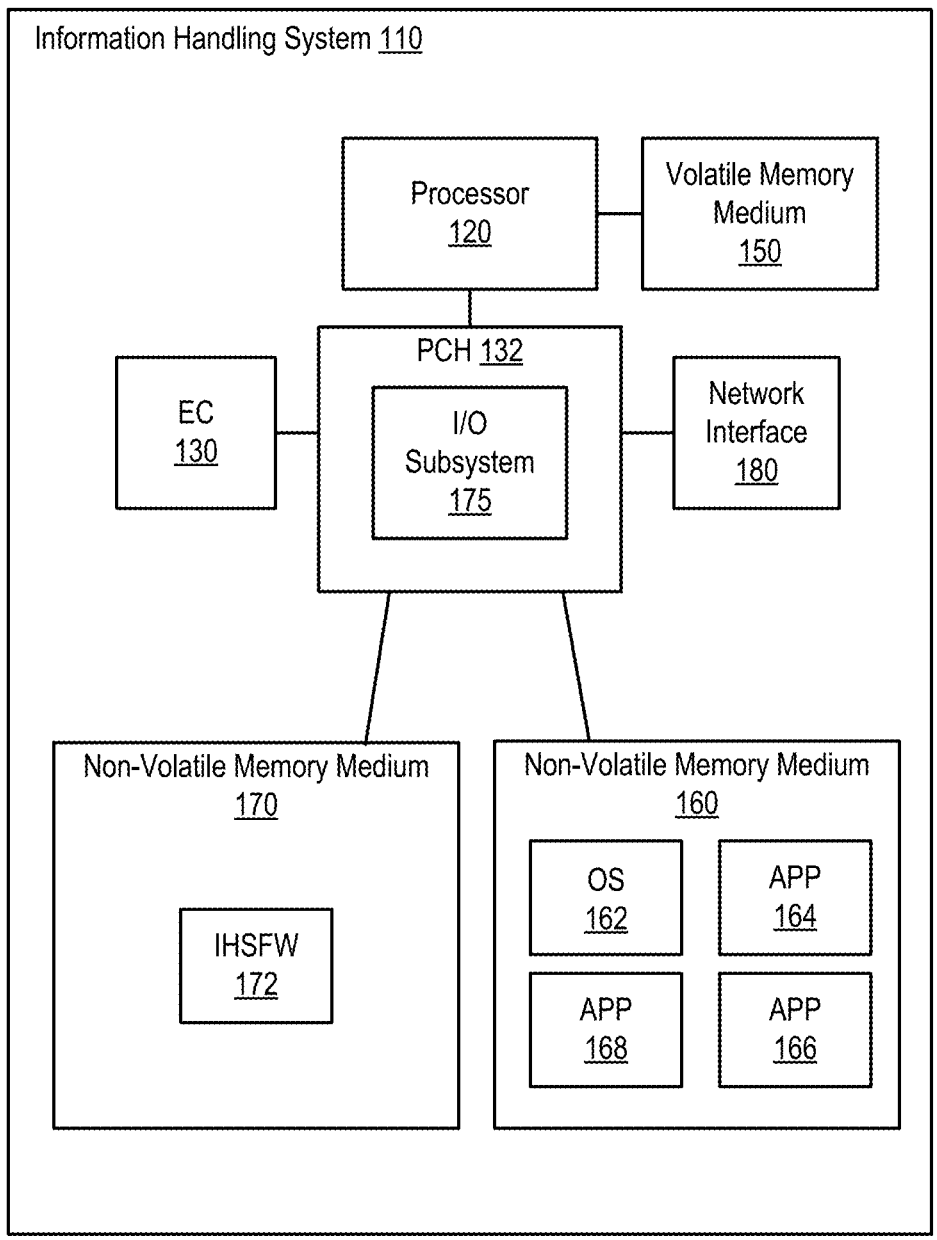
FIG. 1B illustrates another example of an information handling system, according to one or more embodiments.

Turning now to FIG. 1B, another example of an information handling system is illustrated, according to one or more embodiments. In one or more embodiments, IHS 110 may include a platform controller hub (PCH) 132. For example, PCH 132 may be communicatively coupled to processor 120. For instance, PCH 132 may control one or more data paths and/or may support functions utilized in conjunction with processor 120.

In one or more embodiments, PCH 132 may control electrical power to one or more components and clocks of IHS 110. For example, PCH 132 may remain powered on even in power states where processor 120 is powered off. In one or more embodiments, PCH 132 may provide high-level capabilities that may be successively disabled at lower power states.

In one or more embodiments, EC 130, non-volatile memory media 160 and 170, and network interface 180 may be communicatively coupled to PCH 132. For example, EC 130, non-volatile memory media 160 and 170, and network interface 180 may be communicatively coupled to processor 120 via PCH 132. In one or more embodiments, PCH 132 may include I/O subsystem 175.

Figure 2:
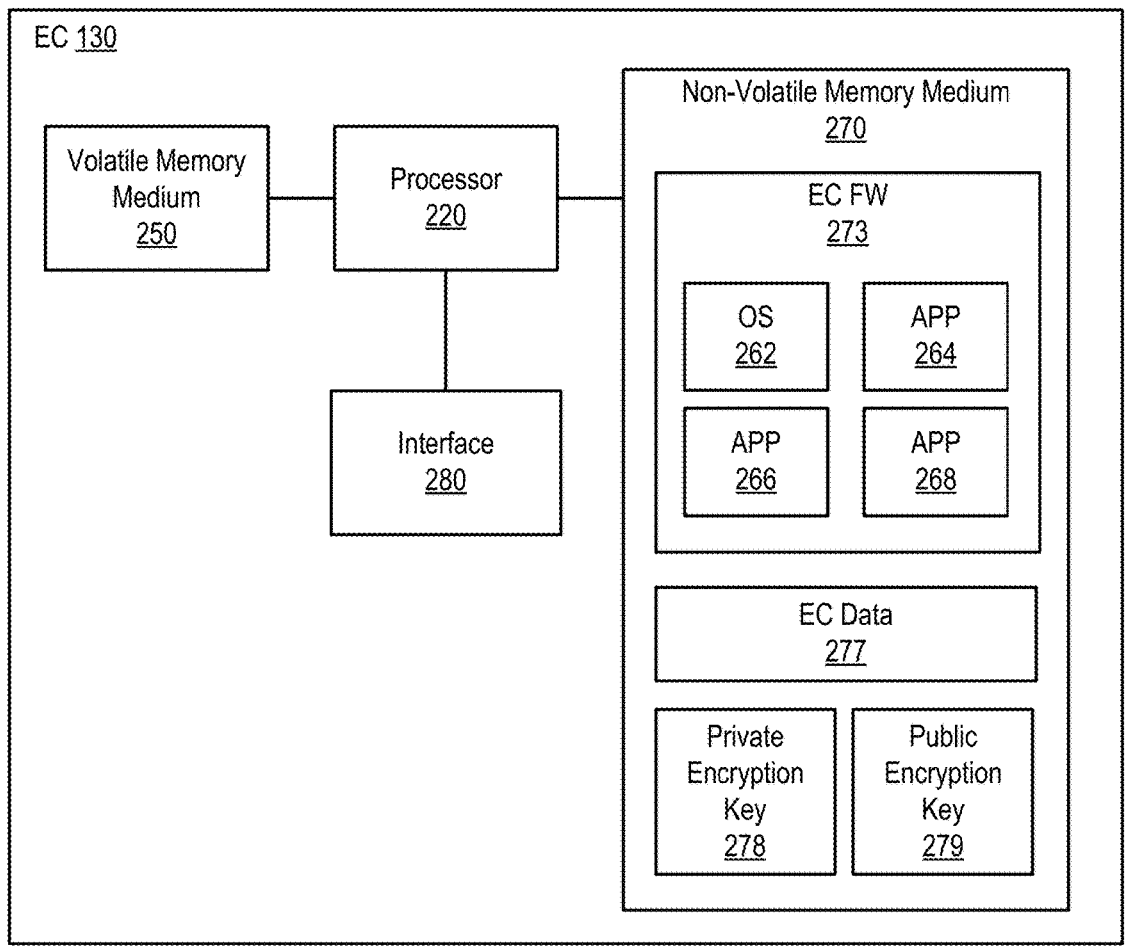
FIG. 2 illustrates an example of an embedded controller, according to one or more embodiments.

Turning now to FIG. 2, an example of an embedded controller is illustrated, according to one or more embodiments. As shown, EC 130 may include a processor 220, a volatile memory medium 250, a non-volatile memory medium 270, and an interface 280. As illustrated, non-volatile memory medium 270 may include an EC firmware (FW) 273, which may include an OS 262 and APPs 264-268, and may include EC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 may be different from public encryption key 279. For example, private encryption key 278 and public encryption key 279 may be asymmetric encryption keys. In one instance, data encrypted via private encryption key 278 may be decrypted via public encryption key 279. In another instance, data encrypted via public encryption key 279 may be decrypted via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

In one or more embodiments, EC 130 may control one or more portions of IHS 110. For example, EC 130 may control when IHS 110 is turned on and/or when IHS 110 is turned off. For instance, EC 130 may receive user input from a power on of IHS 110. As such, EC 130 may never be completely powered off, according to one or more embodiments. For example, when IHS 110 is in the G3 (i.e., mechanical off) power mode, EC 130 may monitor the power button of IHS 110 for user input. For instance, EC 130 may utilize a sleep mode when IHS 110 is in the G3 power mode to minimize power consumption and to monitor the power button of IHS 110 for user input.

In one or more embodiments, EC 130 may utilize one or more sleep modes. For example, the one or more sleep modes may include one or more low power modes. For instance, a low power mode of EC 130 may power down one or more portions of EC 130 while maintaining power to one or more other portions of EC 130. In one or more embodiments, when EC 130 utilizes the one or more sleep modes, EC 130 may utilize little power. As an example, EC 130 utilize 3.3 volts and 90 µA per one million clock cycles of processor 220 (e.g., 90 µA/MHz), and when EC 130 utilizes the one or more sleep modes, EC 130 may utilize 1.5 µA (at 3.3 volts). For instance, when EC 130 is "awake" and/or processing instructions, processor 220 may utilize a clock at 80 MHZ, and EC 130 may consume about 23.76 mW (i.e., 3.3V×90 µA/MHz×80 MHz=0.02376 W). As an example, EC 130 may utilize 23.76 mW when EC 130 is "awake" and may utilize 0.00495 mW when EC 130 is "asleep".

In one or more embodiments, EC 130 may include a wake-up interrupt controller (WIC). For example, the WIC may identify and/or prioritize interrupts. For instance, when the WIC identifies an interrupt, the WIC may wake processor 220 from a low-power sleep mode. As an example, when a user actuates the power button of IHS 110, an interrupt may be instantiated on EC 130, which may wake EC 130 from a sleep mode (e.g., wake processor 220 from a sleep mode). Although the power button of IHS 110 actuated by a user is provided as an example, other events may cause and/or instantiate an interrupt on EC 130, according to one or more embodiments. For example, a voltage change and/or a logic change via the GPIO of EC 130 may cause and/or instantiate an interrupt on EC 130, which may wake EC 130 from a sleep mode.

In one or more embodiments, processor 220 may implement one or more of a wait for interrupt (WFI) instruction, a wait for event (WFE) instruction, and a send event (SEV) instruction, among others. In one or more embodiments, processor 220 may implement a sleep-on-exit instruction. For example, processor 220 may enter a sleep mode when processor 220 returns from handling an interrupt. For instance, EC 130 may wake from a sleep mode to handle an interrupt and may enter or re-enter the sleep mode after EC 130 handles the interrupt. As an example, EC 130 handling the interrupt may include processor 220 executing processor instructions. For instance, an interrupt handler may include the processor instructions, which may be executed by processor 220 to handle the interrupt.

Figure 3A:
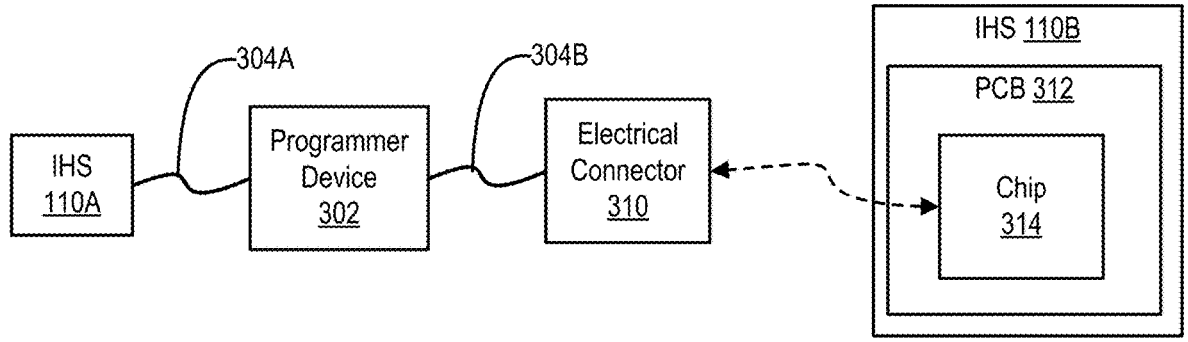
FIGS. 3A and 3B illustrate examples of utilizing a programmer device and an electrical connector with a chip, according to one or more embodiments.
Figure 3B:
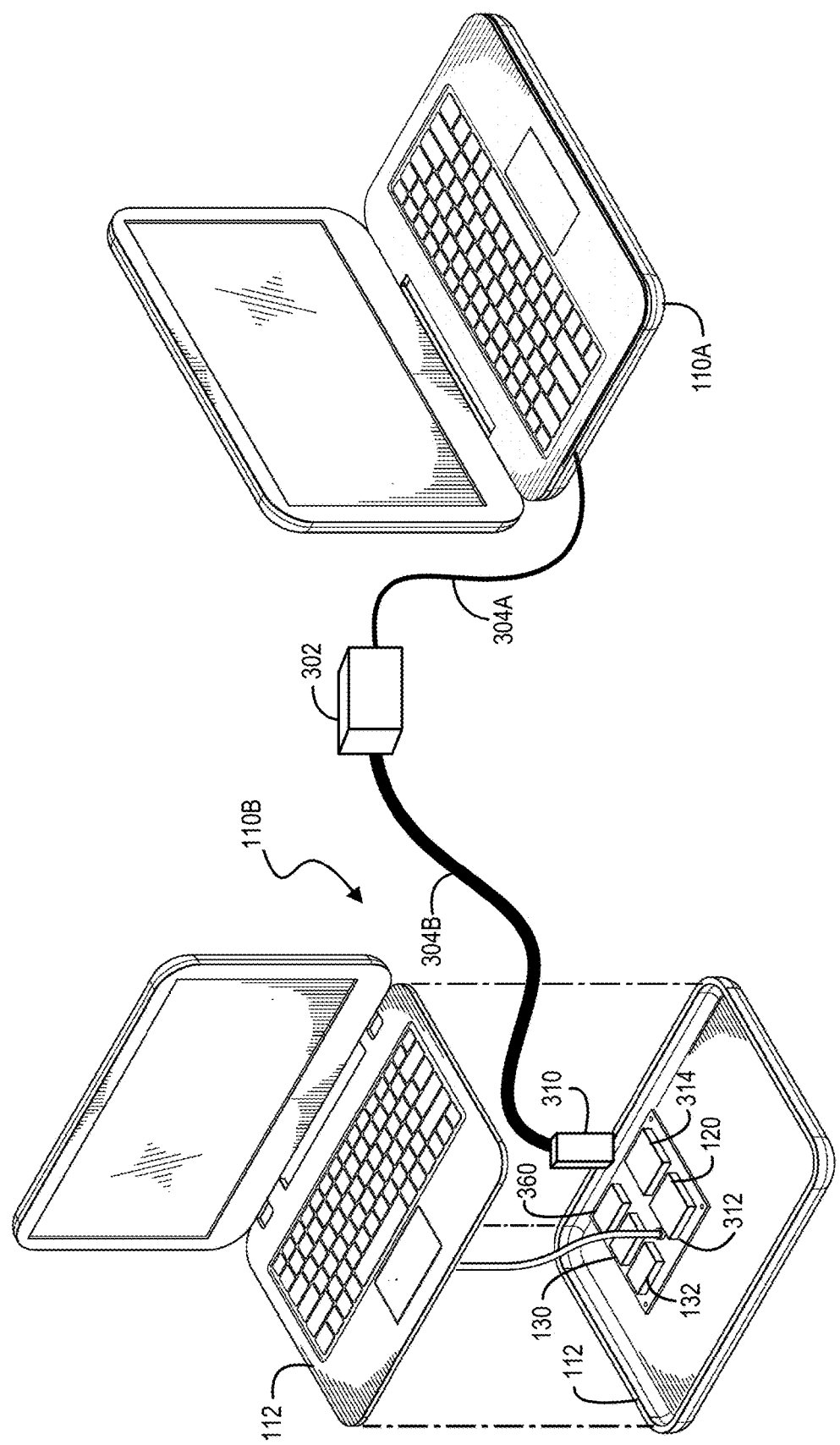

Turning now to FIGS. 3A and 3B, examples of utilizing a programmer device and an electrical connector with a chip are illustrated, according to one or more embodiments. In one or more embodiments, a first information handling system may be communicatively coupled to a programmer device via a first cable. For example, an IHS 110A may be communicatively coupled to a programmer device 302 via a cable 304A. For instance, cable 304A may be or may include a USB cable.

In one or more embodiments, programmer device 302 may include one or more structures and/or one or more functionalities of a Joint Test Action Group (JTAG) debug probe. For example, programmer device 302 may be compliant with Institute of Electrical and Electronics Engineers (IEEE) 1149.1. In one or more embodiments, programmer device 302 may include one or more structures and/or one or more functionalities of a NEXUS 5001™ debug probe. For example, programmer device 302 may be compliant with a NEXUS 5001™ standard and/or with IEEE Industry Standards and Technology Organization (IEEE-ISTO) 5001-2003. In one or more embodiments, programmer device 302 may include one or more structures and/or one or more functionalities of a bus master. In one example, programmer device 302 may include one or more structures and/or one or more functionalities of an I2C bus master. For instance, programmer device 302 may be compliant with an I2C protocol. In another example, programmer device 302 may include one or more structures and/or one or more functionalities of a SPI bus master. For instance, programmer device 302 may be compliant with a SPI protocol.

In one or more embodiments, the programmer device may be communicatively coupled to an electrical connector via a second cable. For example, programmer device 302 may be communicatively coupled to an electrical connector 310 via a cable 304B. For instance, cable 304B may be or may include a ribbon cable. As an example, cable 304B may include multiple conductors, which may be coupled to multiple conductors of electrical connector 310.

In one or more embodiments, a second information handling system may include a PCB. For example, an IHS 110B may include a PCB 312. For instance, PCB 312 may be or include a motherboard of IHS 110B. In one or more embodiments, a chip may be mounted to the PCB of the second information handling system. For example, a chip 314 may be mounted on PCB 312 of IHS 110B. In one or more embodiments, the electrical connector may be coupled to the chip. For example, electrical connector 310 may be coupled to chip 314.

In one or more embodiments, a chassis of the second information handling system may be opened to access the PCB and/or the chip of the second information handling system. For example, IHS 110B may include a chassis 112. For instance, chassis 112 may be opened to access PCB 312 and/or chip 314. As an example, electrical connector 310 may be coupled to chip 314 after chassis 112 is opened.

In one or more embodiments, the electrical connector may be coupled to the chip, which may communicatively couple the programmer device with the chip. For example, electrical connector 310 may be coupled to chip 314, which may communicatively couple programmer device 302 with the chip 314. In one instance, electrical connector 310 may permit programmer device 302 to read data from chip 314. In a second instance, electrical connector 310 may permit programmer device 302 to write data to chip 314. In a third instance, electrical connector 310 may permit programmer device 302 to read processor instructions (e.g., processor instructions executable by processor 120) from chip 314. In another instance, electrical connector 310 may permit programmer device 302 to write processor instructions (e.g., processor instructions executable by processor 120) to chip 314.

In one or more embodiments, the chip may store at least a portion of information handling system firmware of the second information handling system. For example, chip 314 may store at least a portion of IHSFW 172 of IHS 110B. For instance, chip 314 may implement at least a portion of non-volatile memory medium 170 of IHS 110B.

In one or more embodiments, the electrical connector may be coupled to the chip, which may permit the programmer device to write the at least the portion of the information handling system firmware of the second information handling system. For example, electrical connector 310 may be coupled to chip 314, which may permit programmer device 302 to write at least a portion of IHSFW 172 of IHS 110B. For instance, electrical connector 310 may be in physical contact with one or more pins and/or one or more leads of chip 314, which may permit programmer device 302 to write at least a portion of IHSFW 172 of IHS 110B.

In one or more embodiments, writing at least a portion of information handling system firmware of an information handling system may compromise the information handling system. For example, writing the at least the portion of information handling system firmware of the information handling system may introduce a security issue for the information handling system. For instance, writing at least a portion of IHSFW 172 of IHS 110B may compromise IHS 110B. As an example, writing at least a portion of IHSFW 172 of IHS 110B may introduce a security issue for IHS 110B. In one or more embodiments, a security issue may include a security risk.

Figure 3C:
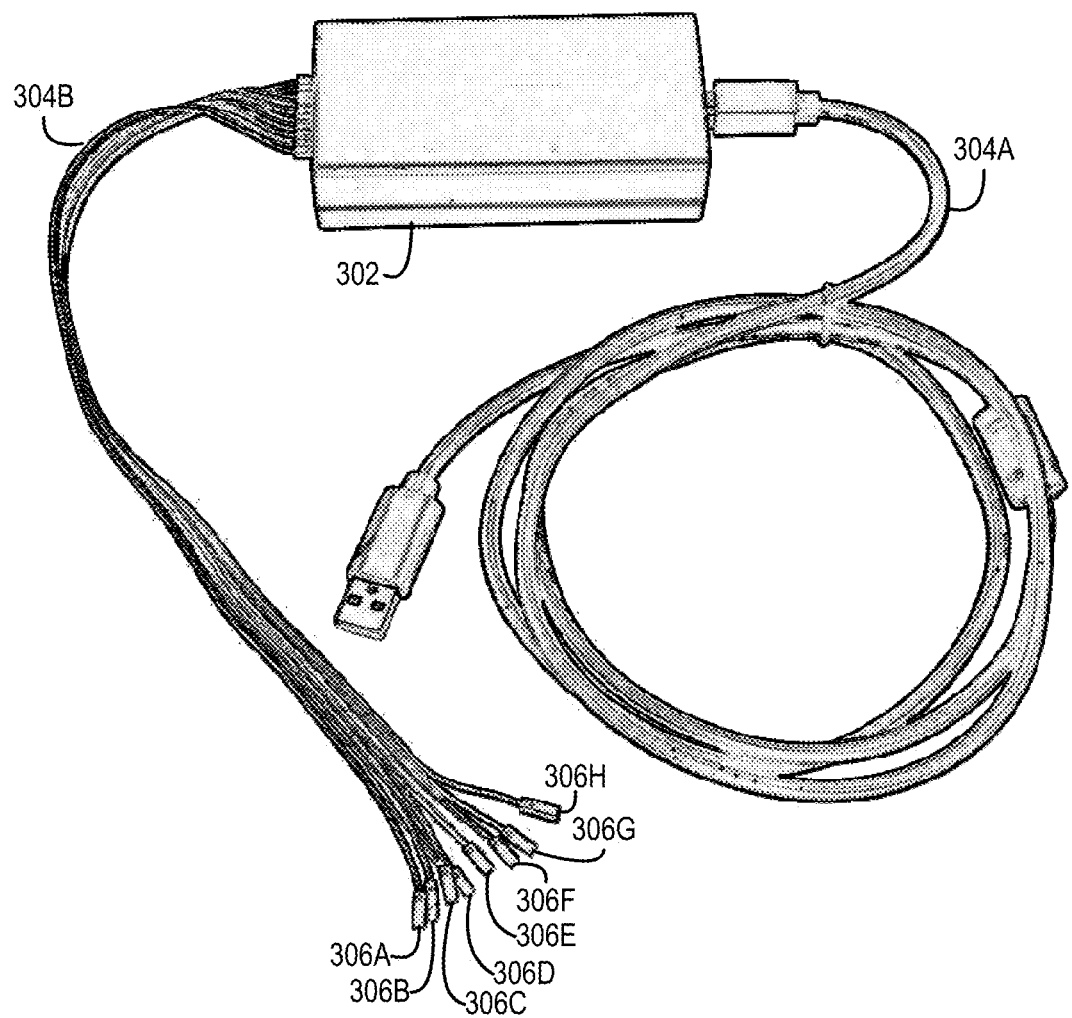
FIG. 3C illustrates an example of a programmer device and cables, according to one or more embodiments.

Turning now to FIG. 3C, an example of a programmer device and cables is illustrated, according to one or more embodiments. In one or more embodiments, cables 304A and 304B may be coupled to programmer device 302. In one example, cable 304A may be coupled to IHS 110A. For instance, cable 304A may be or may include a USB cable. In another example, cable 304B may be coupled to electrical connector 310. For instance, cable 304B may include multiple conductors. As an example, cable 304B may be or may include a ribbon cable. In one or more embodiments, multiple connectors may be coupled to the multiple conductors of cable 304B. For example, connectors 306A-306H may be coupled to the multiple conductors of cable 304B. For instance, connectors 306A-306H may be coupled to electrical connector 310.

Figure 3D:
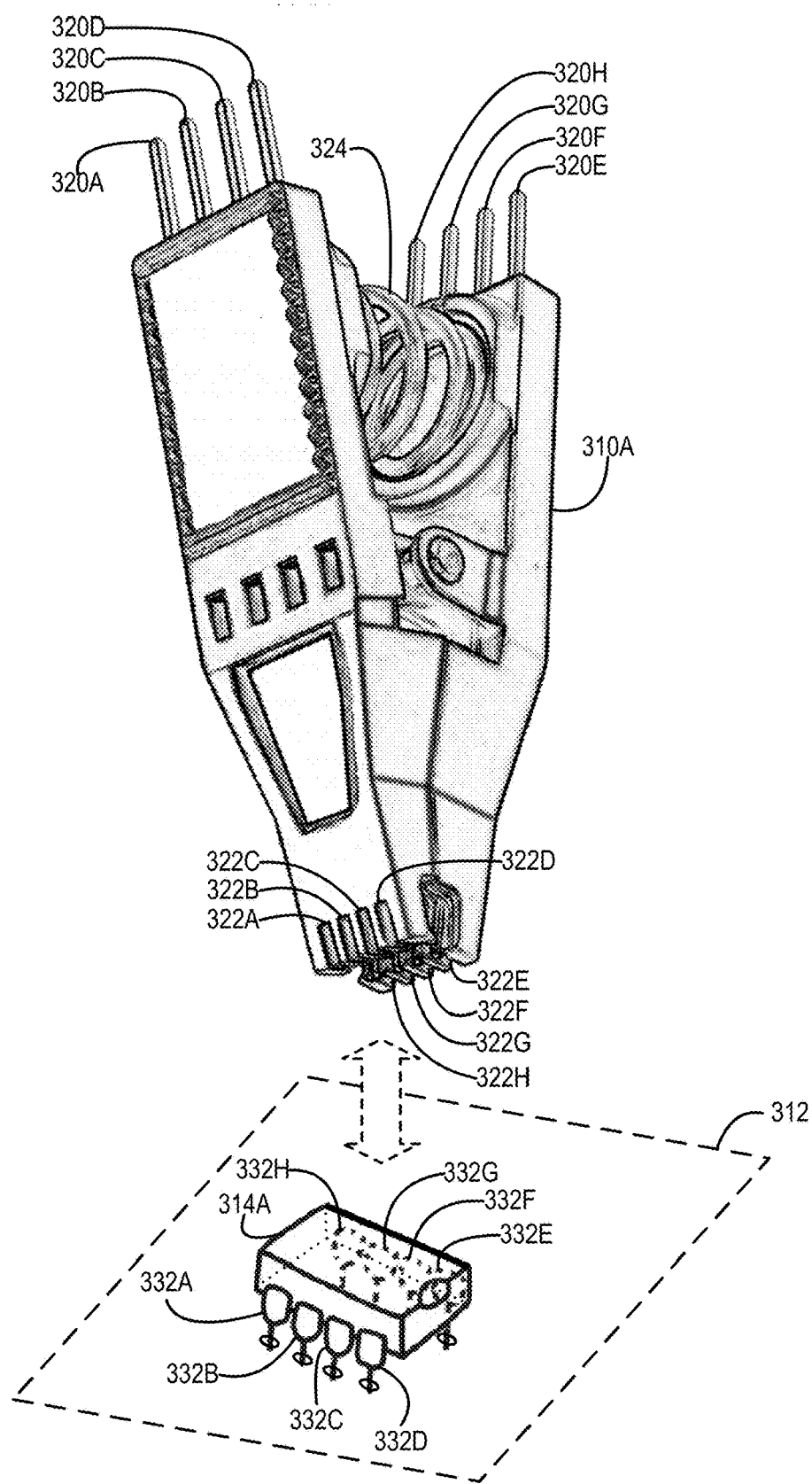
FIGS. 3D and 3E illustrate examples of electrical connectors and chips, according to one or more embodiments.
Figure 3E:
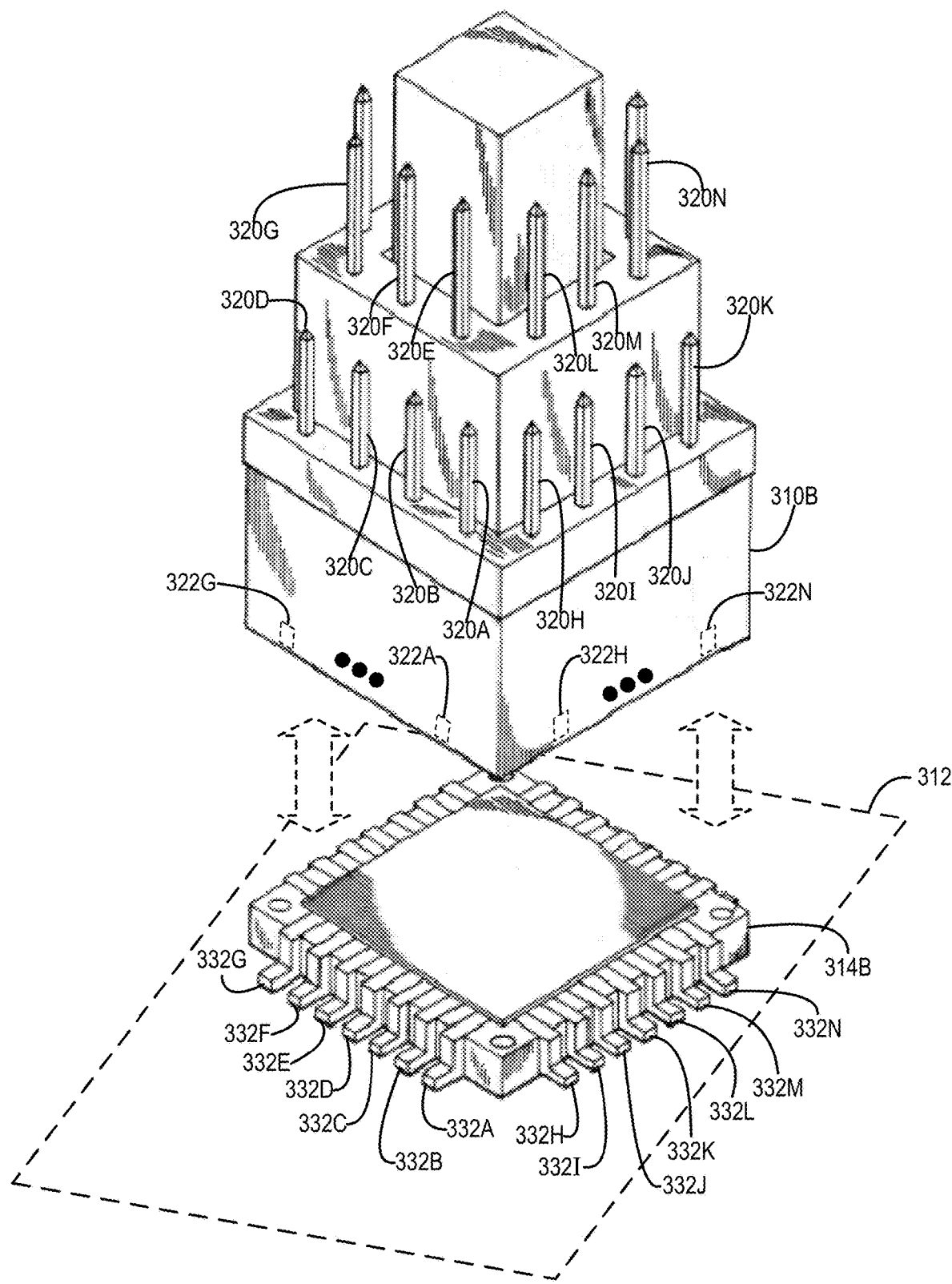

Turning now to FIGS. 3D and 3E, examples of electrical connectors and chips are illustrated, according to one or more embodiments. In one or more embodiments, an electrical connector 310 may be electrically coupled to a chip 314. For example, electrical conductors 322 of electrical connector 310 may be coupled to conductors 332 of chip 314. For instance, a mechanical force may hold electrical conductors 322 to conductors 332. As an example, a spring 324 of electrical connector 310 may provide the mechanical force that may hold electrical conductors 322 to conductors 332.

In one or more embodiments, electrical conductors 322 of electrical connector 310 may be coupled to conductors 320 of electrical connector 310. In one example, electrical conductors 322 may provide first electrical signals from conductors 332 to electrical conductors 322. In one instance, electrical conductors 322 may provide the first electrical signals from conductors 332 to conductors 320. In another instance, conductors 320 may provide the first electrical signals to connectors 306 of cable 304B, which may provide the electrical signals to programmer device 302. In another example, connectors 306 of cable 304B may provide second electrical signals from programmer device 302 to connectors 320, which may provide the second electrical signals to conductors 322. For instance, conductors 322 may provide the second electrical signals to conductors 332.

In one or more embodiments, programmer device 302 may receive data from chip 314. For example, programmer device 302 may read data from chip 314. For instance, programmer device 302 may read data from chip 314 vian electrical connector 310. In one or more embodiments, programmer device 302 may provide data to chip 314. For example, programmer device 302 may write data to chip 314. For instance, programmer device 302 may write data to chip 314 vian electrical connector 310. In one or more embodiments, programmer device 302 may receive processor instructions from chip 314. For example, programmer device 302 may read processor instructions from chip 314. For instance, programmer device 302 may read processor instructions from chip 314 vian electrical connector 310. In one or more embodiments, programmer device 302 may provide processor instructions to chip 314. For example, programmer device 302 may write processor instructions to chip 314. For instance, programmer device 302 may write processor instructions to chip 314 vian electrical connector 310.

In one or more embodiments, electrical conductors 322 may be conductors 320. For example, an electrical conductor 322 and an electrical condor 320 may be a single electrical conductor. In one or more embodiments, conductors 320 may be arranged such that a cable may couple programmer device 302 to conductors 320, which may couple programmer device 302 to conductors 332. For example, electrical connector 310 may be utilized to couple programmer device 302 to chip 314. For instance, electrical connector 310 may be readily coupled to and/or readily removed from chip 314. As an example, electrical connector 310 may be readily coupled to and/or readily removed from chip 314 when chip 314 is soldered to PCB 312.

In one or more embodiments, each of conductors 332 may be configured to a function. In one example, conductor 332A may be configured as a control input. For instance, the control input may be a SPI chip select (CS) input (e.g., inverted CS, not CS, or "/CS"). In a second example, conductor 332B may be configured as a data output. In a third example, conductor 332C may be configured as a write protect input. For instance, the write protect (WP) input may be an inverted WP input (e.g., not WP or "/WP"). In a fourth example, conductor 332D may be configured as a ground. In a fifth example, conductor 332E may be configured as a data input. In a sixth example, conductor 332F may be configured as a voltage common collector (VCC) input. For instance, conductor 332F may be configured as a supply voltage input. In a seventh example, conductor 332G may be configured as a reset input. For instance, the reset input may be an inverted reset input (e.g., not reset or "/RESET"). In another example, conductor 332H may be configured as a chip select input. Although each conductor of conductors 332A-332H is described with a specific function, a conductor 332 may be configured with any function, according to one or more embodiments. For example, a manufacturer of a chip 314 may configure a conductor 332 with any function.

In one or more embodiments, a SPI transaction may include all the data being sent while /CS remains low (e.g., a logical false and/or a logical zero (0)). For example, a SPI transaction may include all data being sent while conductor 332A remains low (e.g., a logical false and/or a logical zero (0)). For instance, a SPI transaction may include all the data being sent while conductor 332A is associated with a voltage value that indicates a logical false and/or a logical zero (0). In one or more embodiments, instructions executable by a processor may control values of /CS (e.g., a logical false and/or a logical zero (0) or a logical true and/or a logical one (1)). For instance, instructions executable by a processor may control values of /CS when an amount of data to transfer exceeds a capacity of transmit queue. In one or more embodiments, a SPI transaction may be atomic which may mean that the SPI transaction is not interrupted by another transaction. For example, an end or a conclusion of a transaction may be indicated by pulling CS high (e.g., a logical true and/or a logical one (1)). For instance, a master of a SPI bus may pull CS high to indicate an end or a conclusion of a transaction. As an example, EC 130 may pull CS high to indicate an end or a conclusion of a transaction. As another example, PCH 132 may pull CS high to indicate an end or a conclusion of a transaction.

As illustrated in FIG. 3D, electrical connector 310A may include conductors 320A-320H and 322A-322H and spring 324. In one or more embodiments, conductors 320A-320H may be respectively coupled to conductors 322A-322H. As an example, conductors 320A-320H may respectively be conductors 322A-322H. In one or more embodiments, conductors 322A-322H may be respectively coupled to pins (e.g., conductors) 332A-332H of a chip 314A. In one or more embodiments, a cable may couple conductors 322A-322H to programmer device 302. For example, conductors 322A-322H may be respectively coupled to conductors 320A-320H. For instance, conductors 320A-320H may be respectively coupled to connectors 306A-306H of cable 304B, which may be coupled to programmer device 302.

In one or more embodiments, chip 314A may be mounted to PCB 312. For example, PCB 312 a motherboard of IHS 110 may be or may include PCB 312. In one instance, chip 314A may be surface mounted to PCB 312. In another instance, chip 314A may be soldered to PCB 312. Although chip 314A is illustrated as a through-hole chip (e.g., with a dual inline package (DIP) form), a chip 314 may be implemented with any package type and/or with any pin configuration, according to one or more embodiments. For example, a chip 314 may be implemented with a single in-line package (SIP), a small-outline package (SOP), a small-outline integrated circuit (SOIC) package, a ball-grid array (BGA) package, a quad flat package (QFP), a quad flat no-leads (QFN) package, a dual flat-pack (DFN) package, or a leaded chip carrier (LCC) package, among others. For instance, a chip 314 may have a LCC package, as shown in FIG. 3E.

As illustrated in FIG. 3E, an electrical connector 310B may include conductors 320A-320N and 322A-322N. In one or more embodiments, conductors 320A-320N may be respectively coupled to conductors 322A-322N. As an example, conductors 320A-320N may respectively be conductors 322A-322N. In one or more embodiments, conductors 322A-322N may be respectively coupled to pins (e.g., conductors) 332A-332N of a chip 314B. In one or more embodiments, a cable may couple conductors 320A-322N to programmer device 302.

In one or more embodiments, chip 314B may be mounted to PCB 312. For example, PCB 312 a motherboard of IHS 110 may be or may include PCB 312. In one instance, chip 314B may be surface mounted to PCB 312. In another instance, chip 314B may be soldered to PCB 312. Although only pins 332 of two sides of chip 310B and only conductors 322 of two sides of electrical connector 310B are specifically identified, pins 332 of another two sides of chip 310B and conductors 322 of another two sides of electrical connector 310B may include one or more structures and/or one or more functionalities of those described with reference to conductors 322A-322N and pins 332A-332N, according to one or more embodiments. For example, electrical connector 310B may include twenty-eight (28) conductors 322 that may be coupled to twenty-eight (28) pins 332 of chip 314B. Although cable 304B is illustrated with connectors 306A-306H, cable 304B may include any number of connectors 306, according to one or more embodiments. In one example, cable 304B may include a connector 306 for each respective conductor 320 of electrical connector 310A. In another example, cable 304B may include a connector 306 for each respective conductor 320 of electrical connector 310B.

Figure 4A:
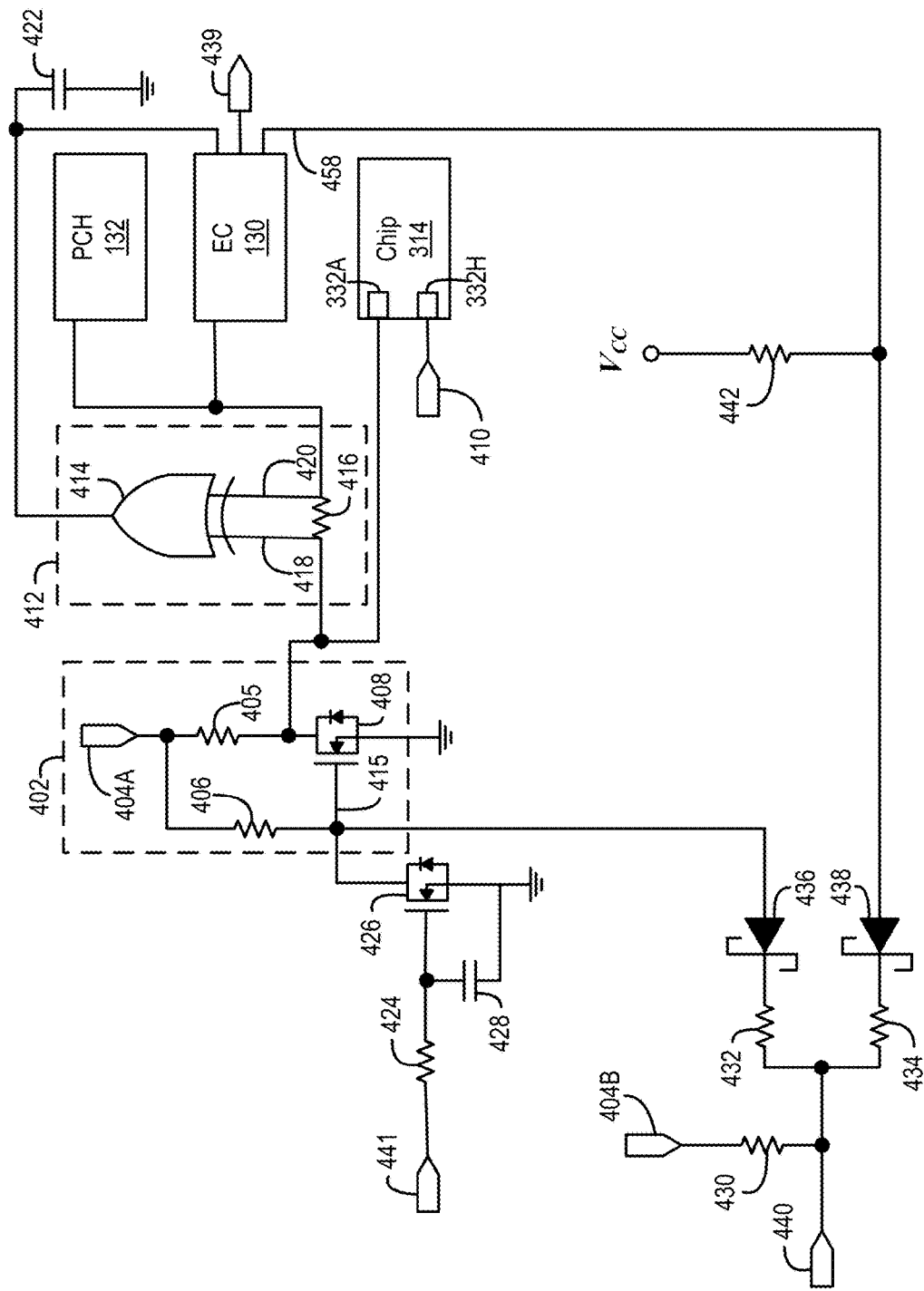
FIGS. 4A and 4B illustrate examples of circuits, according to one or more embodiments.
Figure 4B:
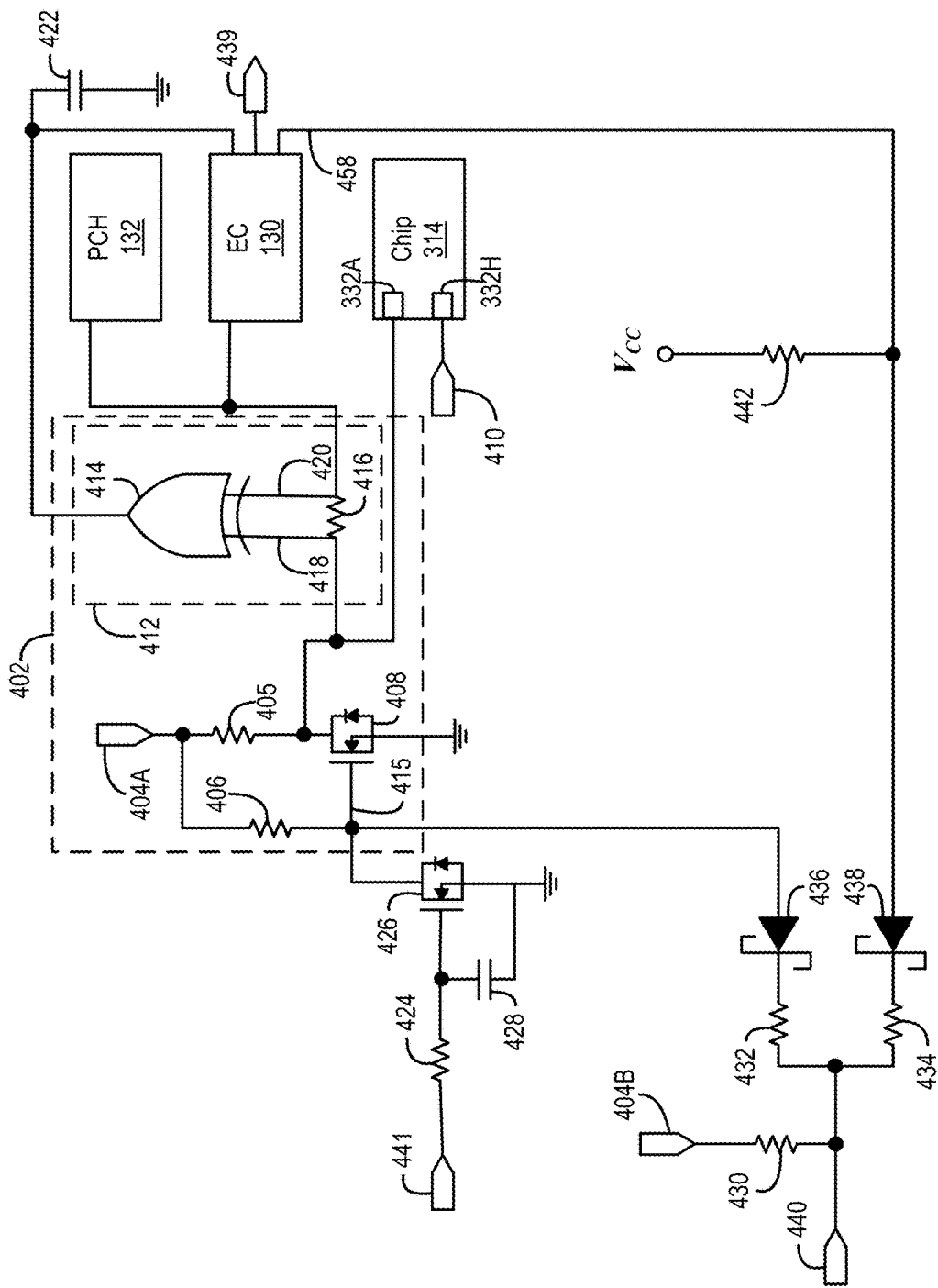

Turning now to FIGS. 4A and 4B, examples of circuits are illustrated, according to one or more embodiments. In one or more embodiments, a circuit 402 may include an input 404A, a resistor 405, a resistor 406, and a transistor 408. For example, transistor 408 may be a metal oxide semiconductor field effect transistor (MOSFET). For instance, transistor 408 may be a N-Channel Enhancement MOSFET. As an example, input 404A may be coupled to resistors 405 and 406. As another example, resistors 405 and 406 may be coupled to transistor 408. In one instance, resistor 405 may be coupled to a drain of transistor 408. In another instance, resistor 406 may be coupled to a gate of transistor 408. In one or more embodiments, transistor 408 may be coupled to ground. For example, a source of transistor 408 may be coupled to ground. In one or more embodiments, an electrical conductors 322 of electrical connector 310 may provide a voltage to input 404A.

In one or more embodiments, voltage applied to a gate of a MOSFET may amplify an amount of electrical current permitted to pass between a source and a drain of the MOSFET (to a threshold amount of current between the source and the drain). For example, voltage applied to the gate of the MOSFET may be nonlinearly amplified as an amount of electrical current permitted to pass between the source and the drain of the MOSFET (with a maximum threshold amount of current between the source and the drain). In one instance, an amount of electrical current permitted to pass between a source and a drain of a MOSFET may be proportional to a voltage applied to a gate of the MOSFET. In another instance, an amount of electrical current permitted to pass between a source and a drain of a MOSFET may be correlated to a voltage applied to a gate of the MOSFET. In one or more embodiments, the voltage applied to the gate of the MOSFET may be a voltage between the gate of the MOSFET and the source of the MOSFET. For example, the voltage applied to the gate of the MOSFET may be referenced to the source of the MOSFET.

In one or more embodiments, input 404A may be coupled to an electrical conductors 322 of electrical connector 310, which may provide a voltage to input 404A. In one or more embodiments, a circuit 412 may include an exclusive-OR (XOR) circuit 414, and a resistor 416. In one example, resistor 416 may be coupled to a first input 418 of XOR circuit 414. In another example, resistor 416 may be coupled to a second input 420 of XOR circuit 414. For instance, resistor 416 may be coupled to input 418 of XOR circuit 414 and may be coupled to input 420 of XOR circuit 414. As an example, resistor 416 may create a voltage difference between input 418 of XOR circuit 414 and input 420 of XOR circuit 414. In one or more embodiments, XOR circuit 414 may be a XOR logic gate. In one or more embodiments, circuit 402 may include circuit 412, as shown in FIG. 4B.

In one or more embodiments, one or more of EC 130 and PCH 132 may be coupled to input 420 of XOR circuit 414. For example, the one or more of EC 130 and PCH 132 may provide respective one or more signals to conductor 332A of chip 314. For instance, the one or more signals to conductor 332A of chip 314 may be one or more chip select signals. As an example, the one or more control signals may be chip select signals associated with a SPI bus. As another example, the one or more control signals may be clock signals associated with a SPI bus.

In one or more embodiments, chip 314 may receive data via input 332H. For example, one or more of EC 130 and PCH 132 may provide data to input 332H via a pin 410. In one or more embodiments, input 418 of XOR circuit 414 may be coupled to conductor 332A of chip 314. For example, input 418 of XOR circuit 414 may be coupled to resistor 405 and transistor 408. For instance, input 418 of XOR circuit 414 may be coupled to resistor 405 and a drain of transistor 408. In one or more embodiments, transistor 408 may pull input 418 of XOR circuit 414 and conductor 332A of chip 314 to a voltage value less than a threshold voltage value. For example, the threshold voltage value may be associated with a logical true and/or a logical one (1). For instance, transistor 408 may pull input 418 of XOR circuit 414 and conductor 332A of chip 314 to a logical false and/or a logical zero (0). In one or more embodiments, an output of XOR circuit 414 may be coupled to EC 130. For instance, XOR circuit 414 may provide one or more signals to EC 130 based at least on inputs 418 and 420.

In one or more embodiments, a capacitor 422 may be coupled to the output of XOR circuit 414. For example, capacitor 422 may be coupled to ground. For instance, capacitor 422 may eliminate or mitigate one or more transient signals. In one or more embodiments, an output 439 of EC 130 may be coupled to a resistor 424 via an input 441. For example, resistor 424 may be coupled to a transistor 426. For instance, transistor 426 may be a MOSFET. As an example, resistor 424 may be coupled to a gate of transistor 426. In one or more embodiments, transistor 426 may be coupled to transistor 408. For example, transistor 426 may be coupled to the gate of transistor 408. For instance, a drain of transistor 426 may be coupled to the gate of transistor 408. In one or more embodiments, transistor 426 may be coupled to resistor 406. For example, the drain of transistor 426 may be coupled to resistor 406. In one or more embodiments, EC 130 may control transistor 408 via transistor 426. For example, EC 130 may provide signals to one or more of input 420 of XOR circuit 414 and conductor 332A of chip 314. For instance, EC 130 may provide signals to one or more of input 420 of XOR circuit 414 and conductor 332A of chip 314 via transistors 426 and 408. In one or more embodiments, when EC 130 is powered on, EC 130 may provide a voltage above a voltage threshold. For example, the voltage threshold may permit transistor 426 to conduct. For instance, transistor 426 may prohibit transistor 408 from conducting when transistor 426 conducts.

In one or more embodiments, an input 404B may be coupled to a resistor 430, which may be coupled to an input 440. In one or more embodiments, input 404B may be coupled to an electrical conductors 322 of electrical connector 310, which may provide a voltage to input 404B. For example, input 404A may be coupled to input 404B. For instance, electrical conductors 322 of electrical connector 310 may be coupled to inputs 404A and 404B. In one or more embodiments, input 440 may be coupled to resistors 430, 432, and 434. In one example, resistor 432 may be coupled a diode 436. In another example, resistor 434 may be coupled a diode 438. In one or more embodiments, diodes 436 and 438 may have forward biases of one hundred fifty (150) millivolts (mV) to four hundred fifty (450) mV. For example, diodes 436 and 438 may not have positively doped and negatively doped (p-n) substrate (e.g., silicon, germanium, etc.) junctions. For instance, diodes 436 and 438 may be Schottky diodes.

In one or more embodiments, input 441 may be coupled to a resistor 424. For example, resistor 424 may be coupled to a capacitor 428. For instance, capacitor 428 may be coupled to ground. As an example, capacitor 428 may eliminate or mitigate one or more transient signals. In one or more embodiments, input 440 may receive a voltage signal below a threshold, which represents a false or a zero (0) value when an information handling system is in ACPI mode S5. For example, input 440 may be pulled low when an information handling system is in ACPI mode S5. For instance, a developer (e.g., a person) may access chip 314 when input 440 is pulled low and when EC 130 is in reset. In one or more embodiments, a resistor 442 may be coupled to VCC. For example, resistor 442 may be coupled to diode 438. For instance, resistor 442 may be a pull up resistor. In one or more embodiments, EC 130 may receive logical one (1) and logical zero (0) signals via EC reset 458. For example, EC reset 458 may be coupled to an anode of diode 438.

Figure 4C:
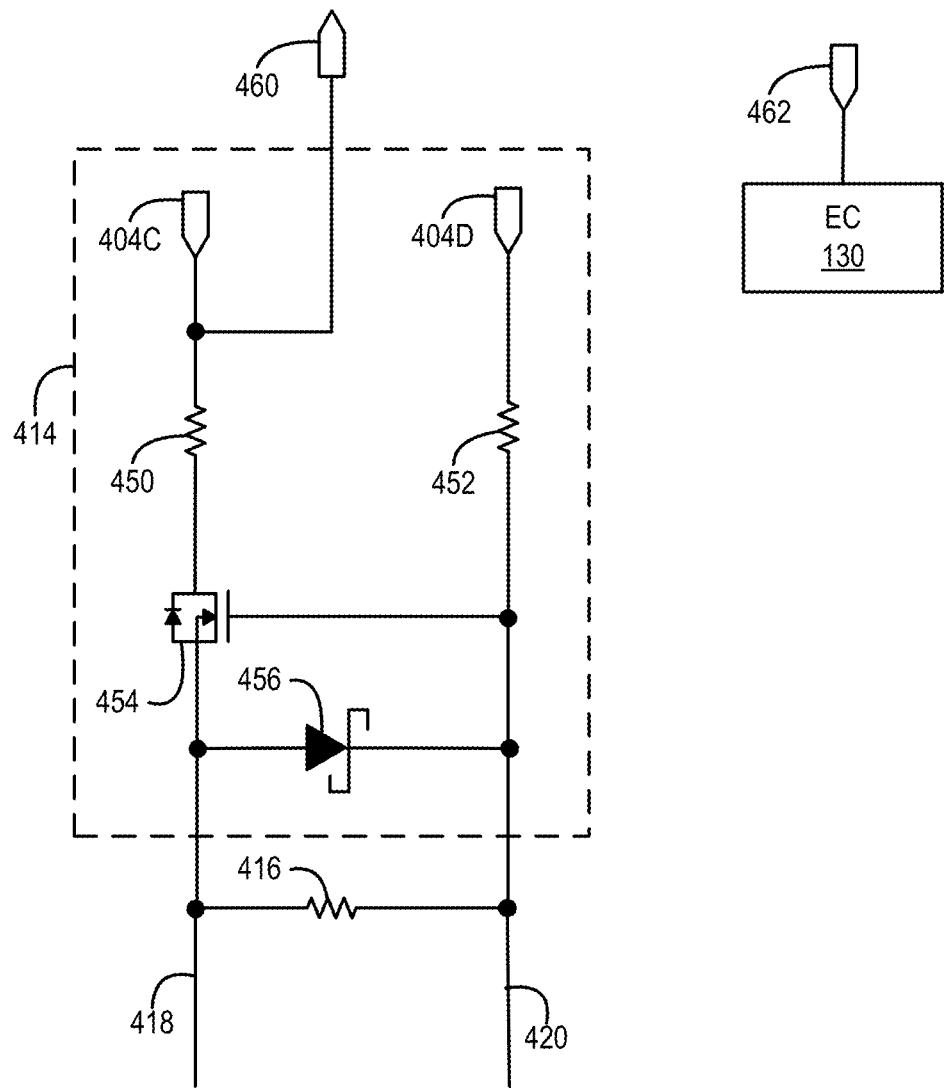
FIG. 4C illustrates an example of an exclusive-OR circuit, according to one or more embodiments.

Turning now to FIG. 4C, an example of an exclusive-OR circuit is illustrated, according to one or more embodiments. In one or more embodiments, XOR circuit 414 may include inputs 404C and 404D. In one or more embodiments, XOR circuit 414 may include a resistor 450. For example, input 404C may be coupled to resistor 450. In one or more embodiments, input 404C may be coupled to a power rail of IHS 110B. For example, input 404C may receive or perceive a logical true or one (1) when IHS 110B is in one or more or power states S0-S5.

In one or more embodiments, XOR circuit 414 may include a resistor 452. For example, input 404D may be coupled to resistor 452. In one or more embodiments, XOR circuit 414 may include a transistor 454. For example, transistor 454 may be coupled to resistors resistor 450 and resistor 452. In one or more embodiments, transistor 454 may be a MOSFET. In one example, a drain of transistor 454 may be coupled to resistor 450. In another example, a gate of transistor 454 may be coupled to resistor 452. In one or more embodiments, XOR circuit 414 may include a diode 456.

In one or more embodiments, a cathode of diode 456 may be coupled to resistor 452 and transistor 454. For example, transistor 454 may be a MOSFET, and a gate of transistor 454 may be coupled to the cathode of diode 456. In one or more embodiments, input 418 may be coupled to the anode of diode 456. For example, input 418 may be coupled to transistor 454. For instance, transistor 454 may be a MOSFET, and input 418 may be coupled to the source of transistor 454. In one or more embodiments, input 420 may be coupled to the cathode of diode 456. For example, input 420 may be coupled to transistor 454. For instance, transistor 454 may be a MOSFET, and input 420 may be coupled to the gate of transistor 454. In one or more embodiments, inputs 418 and 420 may be logical inputs to XOR circuit 414. In one or more embodiments, resistor 416 may be coupled to inputs 418 and 420. In one or more embodiments, an output 460 may be an output of XOR circuit 414. In one or more embodiments, EC 130 may be coupled to an EC reset 458. For example, EC 130 may provide logical one (1) and logical zero (0) signals via EC reset 458. For instance, EC reset 458 may be coupled to diode 438.

Figure 4D:
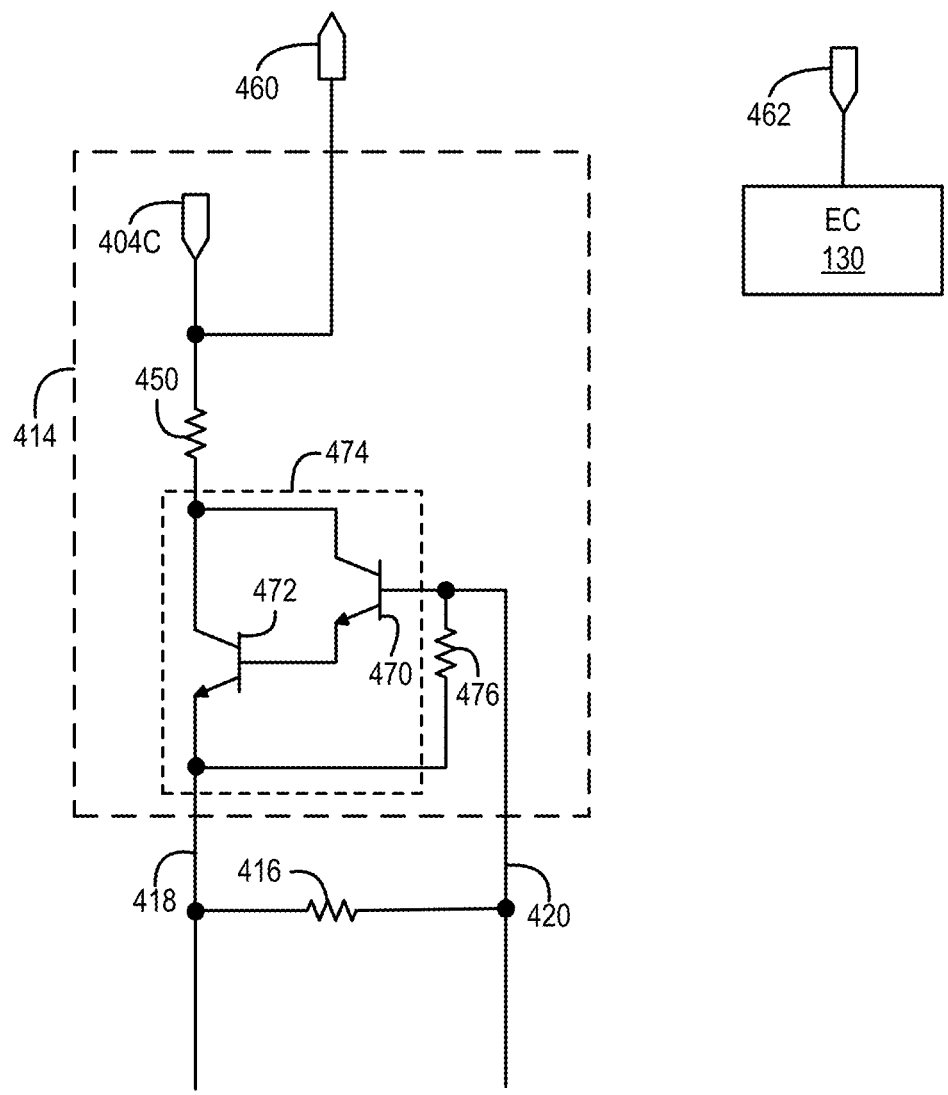
FIG. 4D illustrates another example of an exclusive-OR circuit, according to one or more embodiments.

Turning now to FIG. 4D, another example of an exclusive-OR circuit is illustrated, according to one or more embodiments. In one or more embodiments, XOR circuit 414 may have inputs 418 and 420. For example, inputs 418 and 420 may be coupled to resistor 416. In one or more embodiments, XOR circuit 414 may include a transistor 470. For example, transistor 470 may be a bipolar junction transistor (BJT). For instance, transistor 470 may be a NPN (negative-positive-negative) BJT. In one or more embodiments, XOR circuit 414 may include a transistor 472. For example, transistor 472 may be a BJT. For instance, transistor 472 may be a NPN BJT.

In one or more embodiments, transistors 470 and 472 may be arranged as a Darlington pair. For example, the Darlington pair may be a Darlington transistor 474. For instance, an emitter of transistor 470 may be coupled to a base of transistor 472. In one or more embodiments, Darlington transistor 474 may have a base, an emitter, and a collector. For example, Darlington transistor 474 may be treated as a single BJT. For instance, Darlington transistor 474 may be equivalent to and/or may have properties of a single BJT. In one or more embodiments, Darlington transistor 474 may have a single discrete component package. For example, the single discrete component package may include transistors 470 and 472. For instance, the single discrete component package may include leads coupled to a base, an emitter, and a collector of Darlington transistor 474.

In one or more embodiments, XOR circuit 414 may include a resistor 476. For example, resistor 476 may be coupled to a base of transistor 470 and may be coupled to an emitter of transistor 472. In one or more embodiments, XOR circuit 414 may include a resistor 450. In one example, resistor 450 may be coupled to a collector of transistor 470. In another example, resistor 450 may be coupled to a collector of transistor 472. In one or more embodiments, resistor 450 may be coupled to a collector of Darlington transistor 474. In one or more embodiments, input 418 may be coupled to the emitter of transistor 472. For example, input 418 may be coupled to an emitter of Darlington transistor 474.

In one or more embodiments, input 420 may be coupled to a base of transistor 470. For example, input 420 may be coupled to a base of Darlington transistor 474. In one or more embodiments, output 460 of XOR circuit 414 may be coupled to resistor 450. In one or more embodiments, Darlington transistor 474 may be replaced by a single transistor. For example, Darlington transistor 474 may be replaced by a single BJT. For instance, Darlington transistor 474 may be replaced by a single NPN BJT.

Figure 4E:
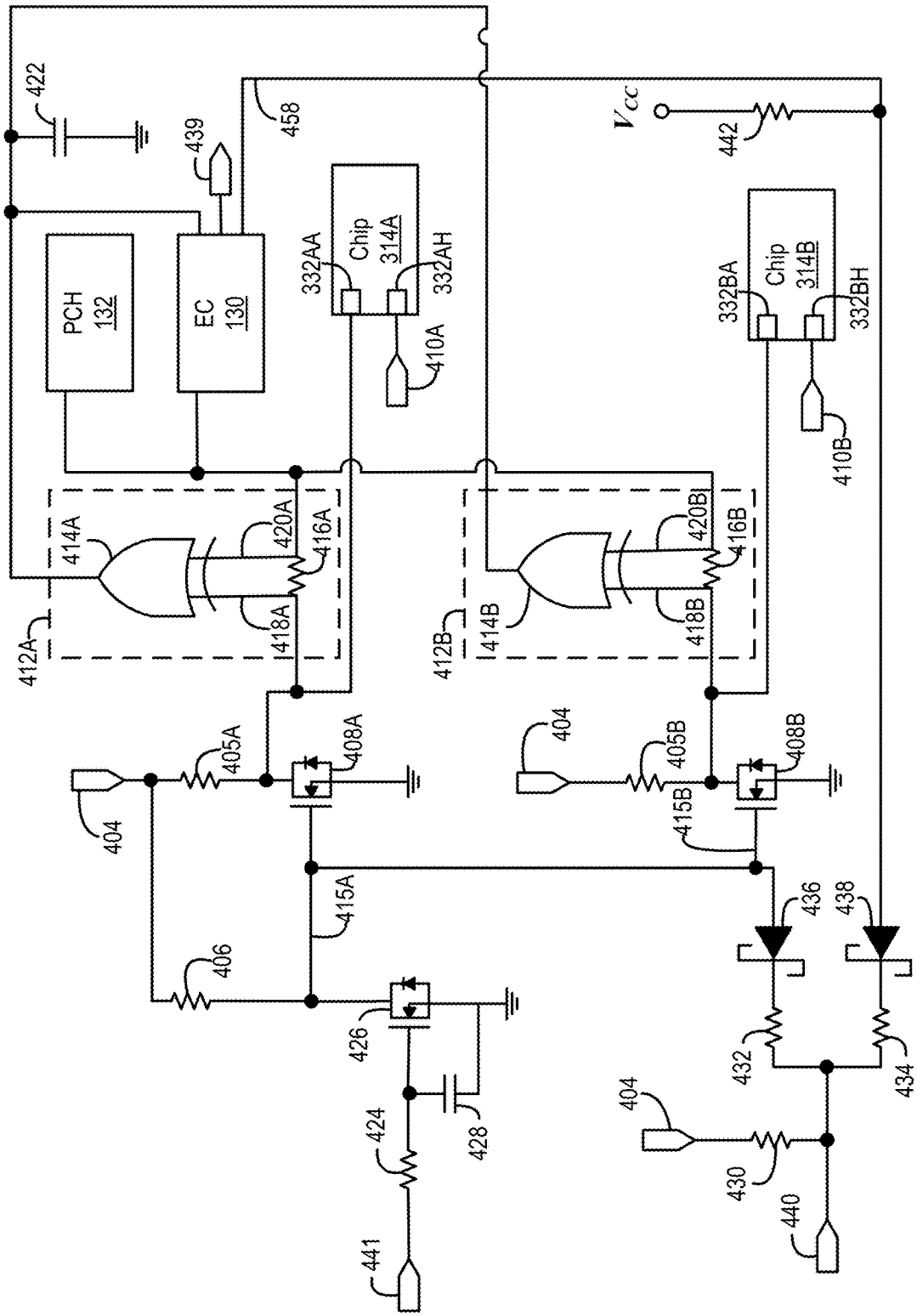
FIG. 4E illustrates an example of a circuit, according to one or more embodiments.

Turning now to FIG. 4E, an example of a circuit is illustrated, according to one or more embodiments. In one or more embodiments, an additional chip 314 may be supported. For example, multiple chips 314 may store data and/or processor instructions. In one instance, a chip 314A may store a first portion of IHSFW 172. In another instance, a chip 314B may store a second portion of IHSFW 172. In one or more embodiments, supporting the additional chip 314 may include utilizing the structures and/or the functionalities of those describe with reference to FIGS. 4A and 4B. For example, elements 405A and 405B, 408A and 408B, 410A and 410B, 412A and 412B, 414A and 414B, 415A and 415B, 416A and 416B, 418A and 418B, and 420A and 420B may respectively include one or more structures and/or one or more functionalities of those respectively described with reference to elements 405, 408, 410, 412, 414, 415, 416, 418, and 420.

Turning now to FIG. 4F, an example of a table of information handling system states and possible associated attack scenarios is illustrated, according to one or more embodiments. In one or more embodiments, a table 480 illustrates power states of IHS 110 and associated possible associated scenarios and/or possible permitted operations. For example, rows 482A-482F show power states of IHS 110 and possible associated attack scenarios and/or possible permitted operations. In one or more embodiments, IHS 110 may be in power state G3 and a person may utilize a connector 310 to access a chip 314 as shown in row 482A. For example, electrical power may be provided to chip 314 via connector 310. In one instance, connector 310 may provide the electrical power to one or more inputs 404. In another instance, connector 310 may pull a lead 418 down (e.g., pull down to a logical false and/or a logical zero (0)). As an example, lead 418 may be associated with a chip select of chip 314.

In one or more embodiments, a SPI specification may specify that a chip select (e.g., CS) is driven high at a byte boundary. For example, if the chip select is not driven high at a byte boundary, a command may be rejected. For instance, if the chip select is not driven high at a byte boundary, a command may be rejected by chip 314. As an example, if chip 314 rejects a command, chip 314 may not execute the command.

In one or more embodiments, in accordance with the SPI specification, the chip select may be driven high after a multiple of eight number of clock pulses subsequent to the chip select being driven low. In one example, if the chip select is driven high after seven clock cycles, chip 314 may reject input data received during the seven clock cycles. In a second example, if the chip select is driven high after nine clock cycles, chip 314 may reject input data received during the nine clock cycles. In a third example, if the chip select is driven high after twenty-three clock cycles, chip 314 may reject input data received during the twenty-three clock cycles. In another example, if the chip select is driven high after thirty-four clock cycles, chip 314 may reject input data received during the thirty-four clock cycles.

In one or more embodiments, when IHS 110 is in power state G3, one or more inputs of chip 314 may be compelled low (e.g., compelled to a logical false and/or a logical zero (0)). For example, this may prevent unauthorized access of chip 314. For instance, when a signal from connector 310 is detected, one or more inputs of chip 314 may be compelled low, which may prevent unauthorized access of chip 314. In one or more embodiments, circuit 402 may compel lead 418 and/or chip select of chip 314 low. For example, transistor 408 may compel lead 418 and/or chip select of chip 314 low. For instance, based at least on input 441, which may control transistor 426, transistor 408 may compel lead 418 and/or chip select of chip 314 low. As an example, transistor 426 may control a gate of transistor 408 via a lead 415.

In one or more embodiments, IHS 110 may be in power state G3, and a person may attempt to utilize a connector 310 to access chip 314 as shown in row 482B. For example, electrical power may be provided to chip 314 via connector 310. In one instance, connector 310 may provide the electrical power to one or more inputs 404. In another instance, connector 310 may pull a lead 418 down (e.g., pull down to a logical false and/or a logical zero (0)). As an example, lead 418 may be associated with a chip select of chip 314.

In one or more embodiments, IHS 110 may be in power state S5, PCH 132 may access a chip 314, and a person may utilize a connector 310 to access chip 314 as shown in row 482C. In one or more embodiments, IHS 110 may receive power via an alternating current (AC). For example, IHS 110 may receive power via one hundred and twenty volts alternating current (120 VAC). In one or more embodiments, SPI bus ownership may be transferred to PCH 132. For example, EC 130 may transfer SPI bus ownership to PCH 132. For instance, a management engine (e.g., INTEL® management engine) may control PCH 132. As an example, after SPI bus ownership is transferred to PCH 132, the management engine may control PCH 132.

In one or more embodiments, processor 120 may be or may include an INTEL® processor or an ADVANCED MICRO DEVICES® (AMD®) processor. In one example, when processor 120 is or includes an INTEL® processor, an INTEL® management engine may be utilized. In another example, when processor 120 is or includes an AMD® processor, an AMD® Secure Technology may be utilized. For instance, the AMD® Secure Technology (formally called Platform Security Processor) may include one or more structures and/or one or more functionalities of the INTEL® management engine.

In one or more embodiments, circuit 412 may detect that a person is utilizing a programmer device 302 and/or a connector 310 to access chip 314. For example, circuit 412 may send a signal to EC 130 when circuit 412 detects that a person is utilizing a programmer device 302 and/or a connector 310 to access chip 314. In one or more embodiments, circuit 412 may determine, via inputs 418 and 420, that chip select signals are originating from PCH 132 and programmer device 302 and/or connector 310. For example, when circuit 412 determines, via inputs 418 and 420, that chip select signals are originating from PCH 132 and programmer device 302 and/or connector 310, circuit 412 may provide a signal (e.g., an alarm signal, an alert signal, etc.) to EC 130. For instance, an XOR circuit 414 may determine, via inputs 418 and 420, that chip select signals are originating from PCH 132 and programmer device 302 and/or connector 310, and in response, XOR circuit may provide a signal (e.g., an alarm signal, an alert signal, etc.) to EC 130.

In one or more embodiments, IHS 110 may be in power state S5, and a test fixture may access a chip 314, as shown in row 482D. In one or more embodiments, input 440 may be pulled low (e.g., pulled down to a logical false and/or a logical zero (0)). In one or more embodiments, PCH 132 may be placed into a reset or a reset mode. For example, a developer may access chip 314. For instance, when the developer accesses chip 314, no alarm or alert signal may be acted upon. As an example, any alarm signal or alert signal may not be detected and/or may be ignored.

In one or more embodiments, IHS 110 may be in power state S0, as shown in rows 482E and 482F. In one or more embodiments, circuit 412 may detect a signal difference between a first signal from PCH 132 and a second signal at chip 314. If circuit 412 does not detect a signal difference, PCH 132 may access chip 314. If circuit 412 does detect a signal difference, circuit 412 may provide a signal (e.g., an alarm signal, an alert signal, etc.) to EC 130 and/or PCH 132. In one or more embodiments, the signal (e.g., the alarm signal, the alert signal, etc.) provided to EC 130 may cause an interrupt. For example, EC 130 may be configured to generate an interrupt based on a signal from circuit 412. For instance, EC 130 may pause processing or may wake up to handle the interrupt caused by the signal (e.g., the alarm signal, the alert signal, etc.) from circuit 412.

Figure 5:
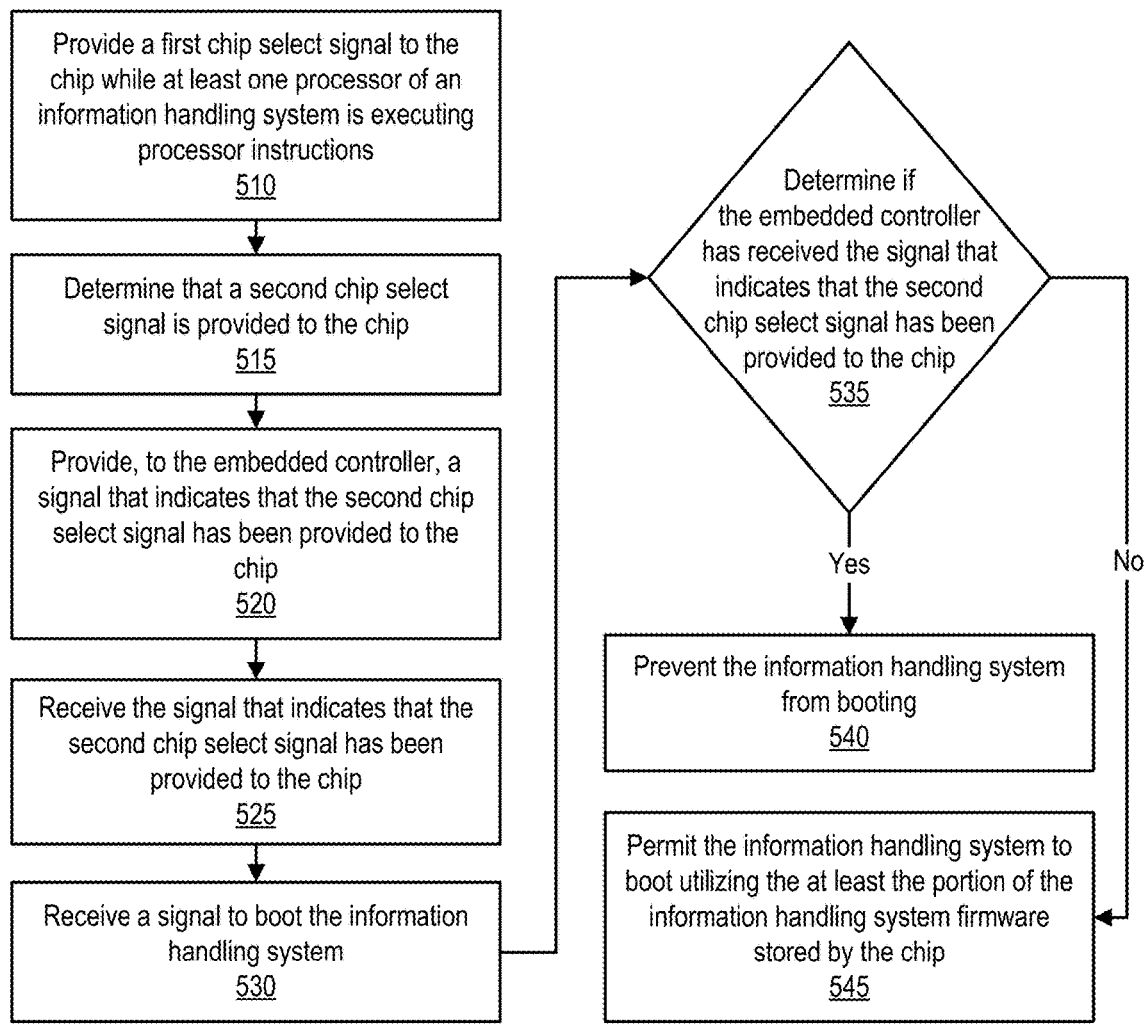
FIG. 5 illustrates an example of a method of operating an information handling system, according to one or more embodiments.

Turning now to FIG. 5, an example of a method of operating an information handling system is illustrated, according to one or more embodiments. At 510, a first chip select signal may be provided to a chip of an information handling system, while at least one processor of the information handling system is executing processor instructions. For example, a first chip select signal may be provided to chip 314 of IHS 110, while processor 120 of IHS 110 is executing processor instructions. For instance, PCH 132 of IHS 110 may provide the first chip select signal to chip 314 of 110, while processor 120 of IHS 110 is executing processor instructions. In one or more embodiments, the chip may store at least a portion of the information handling system firmware that is compliant with at least a portion of a UEFI and is compliant with at least a portion of an ACPI. In one or more embodiments, the chip may include a SPI that is configured to communicate data with a SPI bus of the information handling system. For example, the chip may receive the first chip select signal in accordance with a SPI specification. For instance, a platform controller hub may provide the first chip select signal to the chip in accordance with the SPI specification.

Figure 6A:
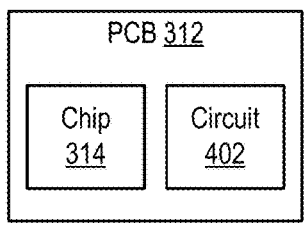
FIG. 6A illustrates an example of a chip and a circuit mounted to a printed circuit board, according to one or more embodiments.
Figure 6B:
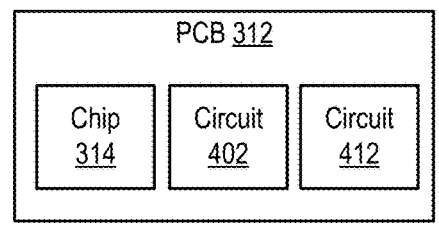
FIG. 6B illustrates an example of a chip and multiple circuits mounted to a printed circuit board, according to one or more embodiments.

At 515, it may be determined that a second chip select signal is provided to the chip. For example, circuit 412 may determine that a second chip select signal is provided to chip 314. In one or more embodiments, the circuit may include a XOR circuit that is configured to determine that the second chip select signal is provided to the chip. In one or more embodiments, the XOR circuit may include a logic gate that is configured with a XOR gate. In one or more embodiments, the XOR circuit may include a MOSFET. For example, an input to the XOR circuit, which receives the first chip select signal, may be coupled to a gate of the MOSFET. In one or more embodiments, the XOR circuit may include a BJT. For example, an input, which receives the first chip select signal, to the XOR circuit may be coupled to a base of the BJT. In one or more embodiments, the BJT may be a Darlington transistor that includes multiple bipolar junction transistors (BJTs). For example, the input to the XOR circuit may be coupled to a base of a first BJT of the Darlington transistor. In one or more embodiments, the circuit and the chip may be mounted to a printed circuit board of the information handling system. For example, the printed circuit board of the information handling system may be a motherboard of the information handling system. For instance, chip 314 and one or more of circuits 402 and 412 may be mounted to PCB 312, as shown in FIGS. 6A and 6B.

At 520, a signal that indicates that the second chip select signal has been provided to the chip may be provided to the embedded controller. For example, circuit 412 may provide, to EC 130, a signal that indicates that the second chip select signal has been provided to chip 314. At 525, the signal that indicates that the second chip select signal has been provided to the chip may be received. For example, EC 130 may receive the signal that indicates that the second chip select signal has been provided to chip 314. In one or more embodiments, the embedded controller may store information associated with the signal that indicates that the second chip select signal has been provided to the chip. For example, EC 130 may store information that indicates that the second chip select signal has been provided to chip 314. For instance, EC 130 may log an event that indicates that the second chip select signal has been provided to chip 314.

At 530, a signal to boot the information handling system may be received. For example, EC 130 may receive a signal to boot IHS 110. For instance, a chassis of IHS 110 may include a button, which when actuated, permits a signal to boot IHS 110 to be provided to EC 130. At 535, it may be determined if the embedded controller has received the signal that indicates that the second chip select signal has been provided to the chip. For example, EC 130 may determine if the embedded controller has received the signal that indicates that the second chip select signal has been provided to chip 314.

In one or more embodiments, determining if the embedded controller has received the signal that indicates that the second chip select signal has been provided to the chip may include retrieving the information associated with the signal that indicates that the second chip select signal is provided to the chip and determining if the embedded controller has received the signal that indicates that the second chip select signal has been provided to the chip based at least on the information associated with the signal that indicates that the second chip select signal is provided to the chip. For example, to determine if EC 130 has received the signal that indicates that the second chip select signal has been provided to the chip, EC 130 may retrieve the information associated with the signal that indicates that the second chip select signal is provided to chip 314 and may determine if EC 130 has received the signal that indicates that the second chip select signal has been provided to chip 314 based at least on the information associated with the signal that indicates that the second chip select signal is provided to chip 314. For instance, to determine if EC 130 has received the signal that indicates that the second chip select signal has been provided to the chip, EC 130 may retrieve the event associated with the signal that indicates that the second chip select signal is provided to chip 314 and may determine if EC 130 has received the signal that indicates that the second chip select signal has been provided to chip 314 based at least on the event associated with the signal that indicates that the second chip select signal is provided to chip 314.

If the embedded controller has received the signal that indicates that the second chip select signal has been provided to the chip, the information handling system may be prevented from booting, at 540. For example, if EC 130 has received the signal that indicates that the second chip select signal has been provided to the chip, EC 130 may prevent IHS 110 from booting. In one or more embodiments, preventing IHS 110 from booting may include not providing a signal to PCH 132, which indicates that processor 120 may boot IHSFW 172.

If the embedded controller has not received the signal that indicates that the second chip select signal has been provided to the chip, the information handling system may be permitted to boot utilizing the at least the portion of the information handling system firmware stored by the chip, at 545. For example, if EC 130 has not received the signal that indicates that the second chip select signal has been provided to chip 314, EC 130 may permit IHS 110 to boot utilizing the at least the portion of IHSFW 172 stored by chip 314. In one or more embodiments, permitting IHS 110 to boot may include providing a signal to PCH 132, which indicates that processor 120 may execute IHSFW 172. For example, permitting IHS 110 to boot may include providing a signal to PCH 132, which indicates that processor 120 may execute the at least the portion of IHSFW 172 stored by chip 314.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a platform controller hub communicatively coupled to the at least one processor;
   an embedded controller communicatively coupled to the at least one processor;
   a chip that stores at least a portion of information handling system firmware, which is executable by the at least one processor, communicatively coupled to the at least one processor, wherein the chip includes a serial peripheral interface (SPI) that is configured to communicate data with a SPI bus of the information handling system; and
   a circuit communicatively coupled to the embedded controller and to a chip select input of the chip;
   wherein the platform controller hub is configured to provide a first chip select signal to the chip in accordance with a SPI specification while the at least one processor is executing processor instructions;
   wherein the chip receives the first chip select signal from the platform controller hub in accordance with the SPI specification;
   wherein the circuit is configured to:
   determine that a second chip select signal is provided to the chip; and
   provide, to the embedded controller, a signal that indicates that the second chip select signal has been provided to the chip; and
   wherein the embedded controller is configured to:
   receive the signal that indicates that the second chip select signal has been provided to the chip;
   receive a signal to boot the information handling system;
   determine if the embedded controller has received the signal that indicates that the second chip select signal has been provided to the chip;
   if the embedded controller has received the signal that indicates that the second chip select signal has been provided to the chip, prevent the information handling system from booting; and
   if the embedded controller has not received the signal that indicates that the second chip select signal has been provided to the chip, permit the information handling system to boot utilizing the at least the portion of the information handling system firmware stored by the chip.

2. The information handling system of claim 1, wherein the circuit includes an exclusive-OR (XOR) circuit that is configured to determine that the second chip select signal is provided to the chip.

3. The information handling system of claim 2,
   wherein the XOR circuit includes a metal oxide semiconductor field effect transistor (MOSFET); and
   wherein an input to the XOR circuit, which receives the first chip select signal, is coupled to a gate of the MOSFET.

4. The information handling system of claim 2,
   wherein the XOR circuit includes a bipolar junction transistor (BJT); and
   wherein an input, which receives the first chip select signal, to the XOR circuit is coupled to a base of the BJT.

5. The information handling system of claim 4, wherein the BJT is a Darlington transistor that includes a plurality of bipolar junction transistors (BJTs).

6. The information handling system of claim 5, wherein the input to the XOR circuit is coupled to a base of a first BJT of the Darlington transistor.

7. The information handling system of claim 1, wherein the information handling system firmware is compliant with at least a portion of a Unified Extensible Firmware Interface (UEFI) and is compliant with at least a portion of an Advanced Configuration and Power Interface (ACPI).

8. The information handling system of claim 1, wherein the circuit and the chip are mounted to a printed circuit board of the information handling system.

9. The information handling system of claim 1,
wherein the embedded controller is further configured to store information associated with the signal that indicates that the second chip select signal has been provided to the chip; and
wherein, to determine if the embedded controller has received the signal that indicates that the second chip select signal has been provided to the chip, the embedded controller is further configured to:
retrieve the information associated with the signal that indicates that the second chip select signal has been provided to the chip; and
determine if the embedded controller has received the signal that indicates that the second chip select signal has been provided to the chip based at least on the information associated with the signal that indicates that the second chip select signal has been provided to the chip.

10. A method, comprising:
providing a first chip select signal to a chip of an information handling system, which store at least a portion of information handling system firmware, while a processor of the information handling system is executing processor instructions;
determining, by a circuit of the information handling system, that a second chip select signal is provided to the chip;
providing, by the circuit to an embedded controller of the information handling system, a signal that indicates that the second chip select signal has been provided to the chip;
receiving, by the embedded controller, the signal that indicates that the second chip select signal has been provided to the chip;
receiving, by the information handling system, a signal to boot the information handling system;
determining, by the embedded controller, if the embedded controller the embedded controller has received the signal that indicates that the second chip select signal has been provided to the chip;
if the embedded controller has received the signal that indicates that the second chip select signal has been provided to the chip, preventing, by the embedded controller, the information handling system from booting; and
if the embedded controller has not received the signal that indicates that the second chip select signal has been provided to the chip, permitting, by the embedded controller, the information handling system to boot utilizing the at least the portion of the information handling system firmware stored by the chip;
wherein the chip includes a serial peripheral interface (SPI) that is configured to communicate data with a SPI bus of the information handling system; and
wherein the chip receives the first chip select signal in accordance with a SPI specification.

11. The method of claim 10, wherein the circuit includes an exclusive-OR (XOR) circuit that is configured to determine that the second chip select signal is provided to the chip.

12. The method of claim 11,
wherein the XOR circuit includes a metal oxide semiconductor field effect transistor (MOSFET); and
wherein an input to the XOR circuit, which receives the first chip select signal, is coupled to a gate of the MOSFET.

13. The method of claim 11,
wherein the XOR circuit includes a bipolar junction transistor (BJT); and
wherein an input, which receives the first chip select signal, to the XOR circuit is coupled to a base of the BJT.

14. The method of claim 13, wherein the BJT is a Darlington transistor that includes a plurality of bipolar junction transistors (BJTs).

15. The method of claim 14, wherein the input to the XOR circuit is coupled to a base of a first BJT of the Darlington transistor.

16. The method of claim 10, wherein the information handling system firmware is compliant with at least a portion of a Unified Extensible Firmware Interface (UEFI) and is compliant with at least a portion of an Advanced Configuration and Power Interface (ACPI).

17. The method of claim 10, wherein the circuit and the chip are mounted to a printed circuit board of the information handling system.

18. The method of claim 10, wherein the receiving, by the information handling system, the signal to boot the information handling system includes receiving, by the embedded controller, the signal to boot the information handling system.

* * * * *